(12) United States Patent
Enge et al.

(10) Patent No.: US 8,843,313 B2
(45) Date of Patent: Sep. 23, 2014

(54) MULTIPATH ISOLATION THROUGH THE COMBINED USE OF ANTENNA DIVERSITY AND FREQUENCY DIVERSITY

(75) Inventors: Per K. Enge, Mountain View, CA (US); Bart Ferrell, Troy, IL (US); Gregory M. Gutt, Ashburn, VA (US); James C. Lassa, Leesburg, VA (US); Michael A. Rizzo, Orange, CA (US); David A. Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/495,958

(22) Filed: Jun. 13, 2012

(65) Prior Publication Data
US 2013/0335268 A1 Dec. 19, 2013

(51) Int. Cl.
*G01S 19/22* (2010.01)
*G01S 19/47* (2010.01)
*G01S 19/50* (2010.01)

(52) U.S. Cl.
CPC ............. *G01S 19/22* (2013.01); *G01S 19/47* (2013.01); *G01S 19/50* (2013.01)
USPC ..................... 701/470; 342/357.61

(58) Field of Classification Search
CPC .......... G01S 19/22; G01S 19/47; G01S 19/50
USPC ......... 701/466–470, 475, 352, 501–502, 505, 701/510, 518, 525, 534; 342/357.44, 342/357.29
See application file for complete search history.

(56) References Cited

U.S. PATENT DOCUMENTS

| 4,809,005 | A | * | 2/1989 | Counselman, III | ............ 342/352 |
| 5,129,605 | A | * | 7/1992 | Burns et al. | ........................ 246/5 |
| 5,185,610 | A | * | 2/1993 | Ward et al. | ............... 342/357.24 |
| 5,450,448 | A | * | 9/1995 | Sheynblat | ...................... 375/346 |

(Continued)

FOREIGN PATENT DOCUMENTS

DE     19701800 A1 * 7/1998 .............. B61L 25/02

OTHER PUBLICATIONS

Ray, "Use of Multiple Antennas to Mitigate Carrier Phase Multipath in Reference Stations," ION GPS-99, Nashville, Sep. 14-17, 1999, pp. 1-11.*

(Continued)

*Primary Examiner* — Calvin Cheung
*Assistant Examiner* — Allen E Quillen
(74) *Attorney, Agent, or Firm* — Vista IP Law Group LLP; Cynthia A. Dixon

(57) ABSTRACT

A method, system, and apparatus are disclosed for multipath isolation through the combined use of antenna diversity and frequency diversity. In particular, the present disclosure utilizes antenna diversity and frequency diversity to combat the deleterious effects of reflected signals on the positioning accuracy of satellite navigation systems. In at least one embodiment, the present disclosure uses two antennas and two frequencies for operation with a satellite navigation system. The present disclosure segregates the antennas and frequencies into two classes: references and monitors. The reference measurements are used for estimating the state of the vehicle, and the monitor measurements are used to detect faults that might degrade the reference estimation. Thus, the present disclosure enables an improvement in the positioning error experienced by roving users in downtown and indoor environments. Applications include positive train control, aircraft surface guidance, marine craft navigation in canals and ports, as well as automotive lane keeping.

28 Claims, 21 Drawing Sheets

(56) References Cited

U.S. PATENT DOCUMENTS

| | | | | |
|---|---|---|---|---|
| 5,563,917 | A * | 10/1996 | Sheynblat | 375/346 |
| 5,726,659 | A * | 3/1998 | Kee et al. | 342/352 |
| 5,796,773 | A * | 8/1998 | Sheynblat | 342/357.44 |
| 5,854,815 | A * | 12/1998 | Lennen | 375/343 |
| 5,917,445 | A * | 6/1999 | Schipper et al. | 342/357.61 |
| 5,969,643 | A * | 10/1999 | Curtis | 340/988 |
| 6,023,239 | A * | 2/2000 | Kovach | 342/357.44 |
| 6,342,853 | B1 * | 1/2002 | Kalafus et al. | 342/357.31 |
| 6,490,523 | B2 * | 12/2002 | Doner | 701/482 |
| 6,639,939 | B1 * | 10/2003 | Naden et al. | 375/140 |
| 7,019,688 | B1 * | 3/2006 | Reuter et al. | 342/357.29 |
| 7,110,882 | B2 * | 9/2006 | Moser et al. | 701/472 |
| 7,642,957 | B2 * | 1/2010 | Lennen et al. | 342/357.27 |
| 7,711,480 | B2 * | 5/2010 | Robbins | 701/471 |
| 7,724,807 | B2 * | 5/2010 | Turetzky et al. | 375/150 |
| 7,885,314 | B1 * | 2/2011 | Walley et al. | 375/144 |
| 7,961,145 | B1 | 6/2011 | Strus et al. | |
| 8,044,852 | B2 * | 10/2011 | Green et al. | 342/357.62 |
| 8,085,191 | B2 * | 12/2011 | Green | 342/357.31 |
| 8,165,807 | B2 * | 4/2012 | Garin | 701/478.5 |
| 8,174,437 | B2 * | 5/2012 | Whitehead | 342/357.24 |
| 8,209,596 | B1 * | 6/2012 | Gilmour et al. | 714/819 |
| 8,242,953 | B2 * | 8/2012 | Dai et al. | 342/357.24 |
| 8,244,271 | B2 * | 8/2012 | Pande et al. | 455/456.1 |
| 2010/0150013 | A1 * | 6/2010 | Hara et al. | 370/252 |
| 2010/0312428 | A1 * | 12/2010 | Roberge et al. | 701/23 |
| 2010/0330940 | A1 * | 12/2010 | Sheynblat et al. | 455/129 |
| 2011/0037646 | A1 * | 2/2011 | Tajima et al. | 342/357.26 |
| 2011/0054729 | A1 * | 3/2011 | Whitehead et al. | 701/29 |
| 2011/0200134 | A1 * | 8/2011 | Khan | 375/267 |
| 2012/0026038 | A1 * | 2/2012 | Vollath | 342/357.68 |
| 2012/0174445 | A1 * | 7/2012 | Jones et al. | 37/197 |
| 2012/0320803 | A1 * | 12/2012 | Skarp | 370/277 |

OTHER PUBLICATIONS

Pratap Misra and Per Enge, "Global Positioning System: Signals, Measurements and Performance," Revised Second Edition, Ganga-Jamuna Press, 2011. (pp. 1-32 and 181-184).

D. J. Sakrison, "Communication Theory: Transmission of Waveforms and Digital Information," John Wiley, 1968. (pp. 173-180).

M. B. Pursley, "Random Processes in Linear Systems," Prentice Hall, 2002. (pp. 68-85).

* cited by examiner

FIG. 7

$$H_{DF}[S] = \frac{1}{s\,LP + 1}$$

$$H_{CMC}[S] = \frac{s\sqrt{BPa\,BPb}}{(s\,BPa + 1)(s\,BPb + 1)}$$

FIG. 8

Impulse response of $h_{DF}[t] = \mathcal{L}^{-1}\{H_{DF}[s]\}$ $$= \frac{e^{-\frac{t}{LP}}}{LP}\,UnitStep[t]$$

Step response of $h_{DF}[t] = \mathcal{L}^{-1}\left\{\frac{H_{DF}[s]}{S}\right\}$ $$= \left[1 - e^{-\frac{t}{LP}}\right]UnitStep[t]$$

Ramp response of $h_{DF}[t] = \mathcal{L}^{-1}\left\{\frac{H_{DF}[s]}{s^2}\right\}$ $$= \left(-LP + e^{-\frac{t}{LP}} LP + t\right) UnitStep[t]$$

Impulse response of $h_{CMC}[t] = \mathcal{L}^{-1}\{H_{CMC}[s]\}$ $$= \sqrt{BPa\,BPb}\left[\frac{e^{-\frac{t}{BPa}}}{BPa\,(BPa - BPb)} + \frac{e^{-\frac{t}{BPb}}}{(BPa - BPb)\,BPb}\right] UnitStep[t]$$

Step response of $h_{CMC}[t] = \mathcal{L}^{-1}\left\{\frac{H_{DF}[s]}{S}\right\}$ $$= \sqrt{BPa\,BPb}\left[\frac{e^{-\frac{t}{BPa}}}{BPa - BPb} - \frac{e^{-\frac{t}{BPb}}}{BPa - BPb}\right] UnitStep[t]$$

Ramp response of $h_{CMC}[t] = \mathcal{L}^{-1}\left\{\frac{H_{DF}[s]}{s^2}\right\}$ $$= \left[\sqrt{BPa\,BPb}\left(1 - \frac{BPa\,e^{-\frac{t}{BPa}}}{BPa - BPb} + \frac{BPb\,e^{-\frac{t}{BPb}}}{BPa - BPb}\right)\right] UnitStep[t]$$

FIG. 9

$M_{L1}(t) = A \cos\left[k_{L1} S_{AZ} \bar{d} - K_{L1} S_{AZ} \delta[X_A]\right]$ $A$ = amplitude of the multipath error
$K_{L1}$ = wave number at L1 frequency
$S_{AZ}$ = Sin [Az]
$\bar{d}$ = nominal distance to reflection
$\delta[X_A]$ = perturbation in reflection distance due to surface roughness

FIG. 10

$$Rmult[\tau] = \frac{A^2}{2} \exp\left[-(K_{L1} S_{AZ})^2 (Rm[0] - Rm[\tau])\right]$$

$$= \frac{A^2}{2} \exp\left[-(K_{L1} S_{AZ})^2 \sigma^2\right] \exp\left[(K_{L1} S_{AZ})^{2K} Rm[\tau]\right]$$

$$= \frac{A^2}{2} \exp\left[-(K_{L1} S_{AZ})^2 \sigma^2\right] \left(1 + \sum_{K=1}^{\infty} \frac{(K_{L1} S_{AZ})^{2K} (Rm[\tau])^K}{K!}\right)$$

$Rm[\tau]$ = random process describing roughness of reflecting surface
$Rm[0] = \sigma^2$ = variance of surface roughness

FIG. 11

$$Rm[\tau] = \sigma^2 \, Exp\left[\frac{-\Delta x^2}{d_x^2}\right]$$

$$Rmult[\tau] = \frac{A^2}{2} \, Exp[-(K_{L1} S_{AZ})^2 \, \sigma^2] \left(1 + \sum_{K=1}^{\infty} \frac{(K_{L1} S_{AZ} \sigma)^{2K}}{K!} \, Exp\left[\frac{-kv_x^2 \tau^2}{d_x^2}\right]\right)$$

$\Delta x$ = distance along reflecting surface
$d_x$ = decorrelation distance of reflecting surface
$v_x$ = train velocity
$\tau$ = time between samples of the multipath error

FIG. 12

$$R_{CSC}[\tau] = f * Rmult$$

$$f = h * \tilde{h} = \int_{-\infty}^{\infty} h(t) \, h(t - \tau) \, dlt$$

$h[t\_]$ = impulse response of either DF or CMC filters
$h[t\_] = \mathcal{L}^{-1}\{H(s)\}$

FIG. 13

MULTIPATH ISOLATION THROUGH THE COMBINED USE OF ANTENNA DIVERSITY AND FREQUENCY DIVERSITY

BACKGROUND

The present disclosure relates to multipath isolation. In particular, it relates to multipath isolation through the combined use of antenna diversity, frequency diversity, and sensing of vehicle direction and speed.

SUMMARY

The present disclosure relates to a method, system, and apparatus for multipath isolation through the combined use of antenna diversity and frequency diversity. In one or more embodiments, a disclosed method to improve navigation for a vehicle by utilizing detected multipath on the vehicle involves receiving, with a monitor antenna, at least one first signal. In one or more embodiments, the monitor antenna is located at a position on the front area of the vehicle. The method further involves receiving, with a reference antenna, at least one second signal. In at least one embodiment, the reference antenna is located at a position on the back area of the vehicle. Also, the method involves processing, with at least one monitor receiver, at least one first signal to obtain monitor measurement information for multipath detection. In addition, the method involves processing, with at least one reference receiver, at least one second signal to obtain reference measurement information. Further, the method involves generating, with at least one processor, an estimate of the state of the reference antenna by using: the monitor measurement information, the reference measurement information, and estimates of the speed and direction of the vehicle. The processor uses the speed and direction information to determine when the reference antenna occupies a former location of the monitor antenna where monitor measurement information was previously made available.

In one or more embodiments, the state of the reference antenna comprises a position of the vehicle, a velocity of the vehicle, and/or time offsets for the vehicle. In at least one embodiment, at least one first signal and at least one second signal each include at least one navigation signal transmitted from at least one satellite. In some embodiments, at least one satellite is a Low Earth Orbiting (LEO) satellite, a Medium Earth Orbiting (MEO) satellite, and/or a Geosynchronous Earth Orbiting (GEO) satellite. In one or more embodiments, the position of the monitor antenna is in alignment with the position of the reference antenna along the length and direction of the vehicle. In some of these embodiments, the reference antenna will pass through a previous location of the monitor antenna. Moreover, dead reckoning sensors enable the processor to compute exactly when the reference antenna passes through the previous location of the monitor antenna.

In at least one embodiment, the monitor antenna and the reference antenna are each configured to receive signals having a first frequency and signals having a second frequency. In one or more embodiments, at least one monitor receiver includes at least one monitor filter to filter at least one first signal, and at least one reference receiver includes at least one reference filter to filter at least one second signal, where at least one monitor filter uses a shorter time constant than at least one reference filter. In some embodiments, the vehicle is a train, a terrestrial vehicle, an aircraft, or a marine vessel.

In one or more embodiments, a system to improve navigation for a vehicle by utilizing detected multipath on the vehicle involves a monitor antenna to receive at least one first signal. In at least one embodiment, the monitor antenna is located at a position on the front area of the vehicle. The system further involves a reference antenna to receive at least one second signal. In some embodiments, the reference antenna is located at a position on the back area of the vehicle. Also, the system involves at least one monitor receiver to process at least one first signal to obtain monitor measurement information. In addition, the system involves at least one reference receiver to process at least one second signal to obtain reference measurement information. Further, the system involves at least one processor to generate an estimate of the state of the reference antenna by using the monitor measurement information and by using the reference measurement information.

In at least one embodiment, a method to improve navigation for at least two vehicles (e.g., at least two train cars ganged together) by utilizing detected multipath on the vehicles involves receiving, with at least one monitor antenna for at least one of the vehicles, at least one first signal. The method further involves receiving, with a reference antenna for one of the vehicles, at least one second signal. In one or more embodiments, the monitor antenna(s) is located at a position in front of the position of the reference antenna.

In addition, the method involves processing, with at least one monitor receiver for each of the monitor antennas, at least one first signal (which is received by the monitor antenna that is associated with the monitor receiver(s)) to obtain monitor measurement information for the vehicle that is associated with the monitor receiver(s). Additionally, the method involves processing, with at least one reference receiver for the reference antenna, at least one second signal (which is received by the reference antenna) to obtain reference measurement information for the vehicle that is associated with the reference receiver(s). Further, the method involves generating, with at least one processor, an estimate of the state of the reference antenna by using the monitor measurement information and by using the reference measurement information.

In one or more embodiments, the state of the reference antenna comprises a position of the vehicle associated with the reference antenna, a velocity of the vehicle associated with the reference antenna, and/or time offsets for the vehicle associated with the reference antenna. In at least one embodiment, at least one first signal and at least one second signal each include at least one navigation signal transmitted from at least one satellite. In some embodiments, at least one satellite is a Low Earth Orbiting (LEO) satellite, a Medium Earth Orbiting (MEO) satellite, or a Geosynchronous Earth Orbiting (GEO) satellite.

In at least one embodiment, the position of at least one monitor antenna is in alignment with the position of the reference antenna. In some embodiments, at least one monitor antenna and the reference antenna are each configured to receive signals having a first frequency and signals having a second frequency. In one or more embodiments, at least one monitor receiver includes at least one monitor filter to filter at least one first signal, and at least one reference receiver includes at least one reference filter to filter at least one second signal. In some embodiments, at least one monitor filter uses a shorter time constant than at least one reference filter. In at least one embodiment, at least one of the vehicles is a train, a terrestrial vehicle, an aircraft, and/or a marine vessel.

In one or more embodiments, a system to improve navigation for at least two vehicles (e.g., at least two train cars ganged together) by utilizing detected multipath on the vehicles involves at least one monitor antenna, for at least one of the vehicles, to receive at least one first signal. The system further involves a reference antenna for one of the vehicles, to receive at least one second signal. In at least one embodiment, the monitor antenna(s) is located at a position in front of the position of the reference antenna.

In addition, the system involves at least one monitor receiver for each of the monitor antennas to process at least one first signal (which is received by the monitor antenna that is associated with the monitor receiver(s)) to obtain monitor measurement information for the vehicle that is associated with the monitor receiver(s). Also, the system involves at least one reference receiver for the reference antenna to process at least one second signal (which is received by the reference antenna) to obtain reference measurement information for the vehicle that is associated with the reference receiver(s). Further, the system involves at least one processor to generate an estimate of the state of the reference antenna by using the monitor measurement information and by using the reference measurement information.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

Figure 6:
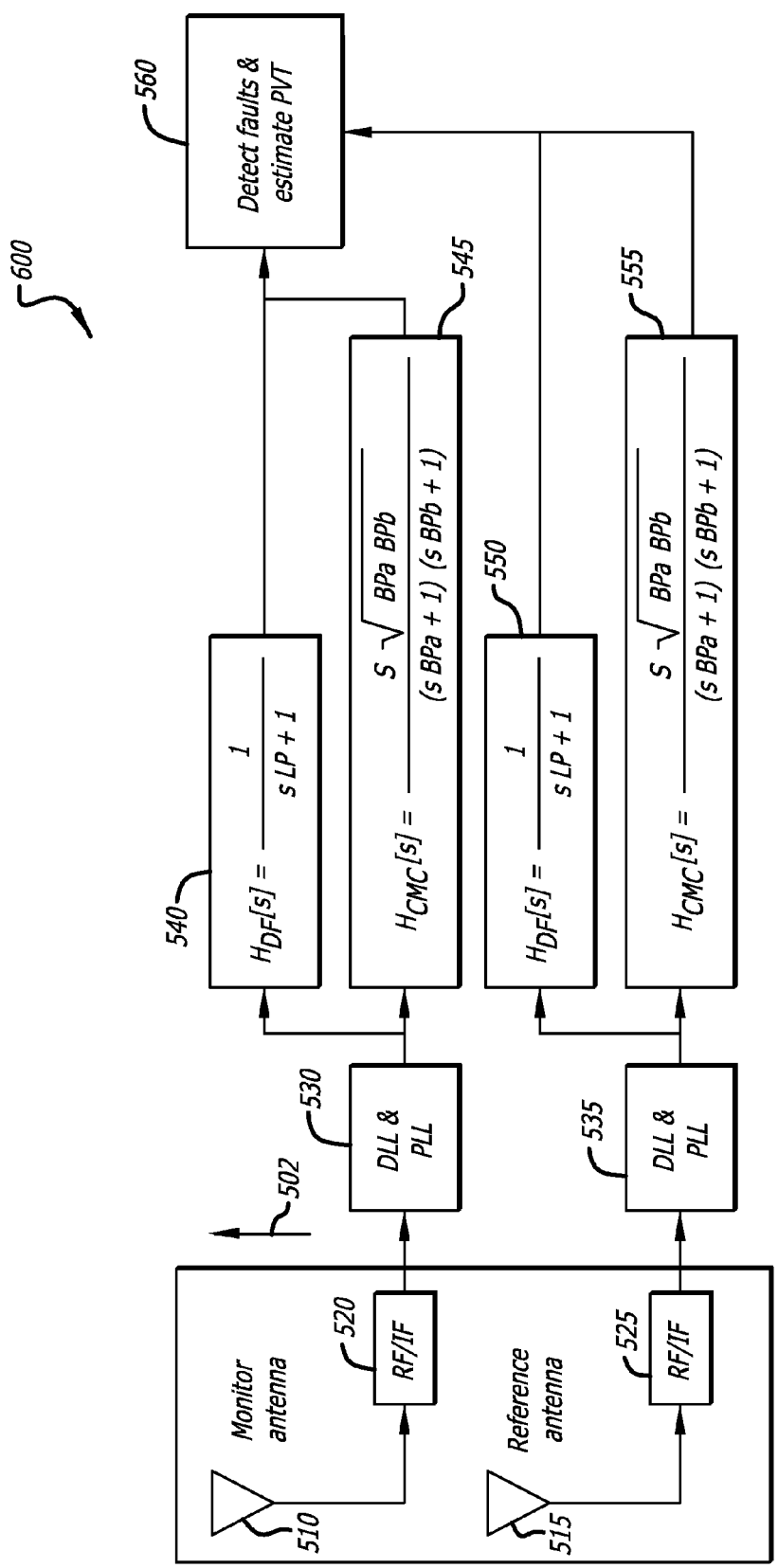
FIG. 6 is a diagram of the exemplary receiver and processor design of FIG. 5 showing the mathematical model for the analysis, in accordance with at least one embodiment of the present disclosure.

FIGS. 7 through 13 contain detailed formulas used for the analysis performed for the mathematical model of FIG. 6, in accordance with at least one embodiment of the present disclosure.

Figure 5:
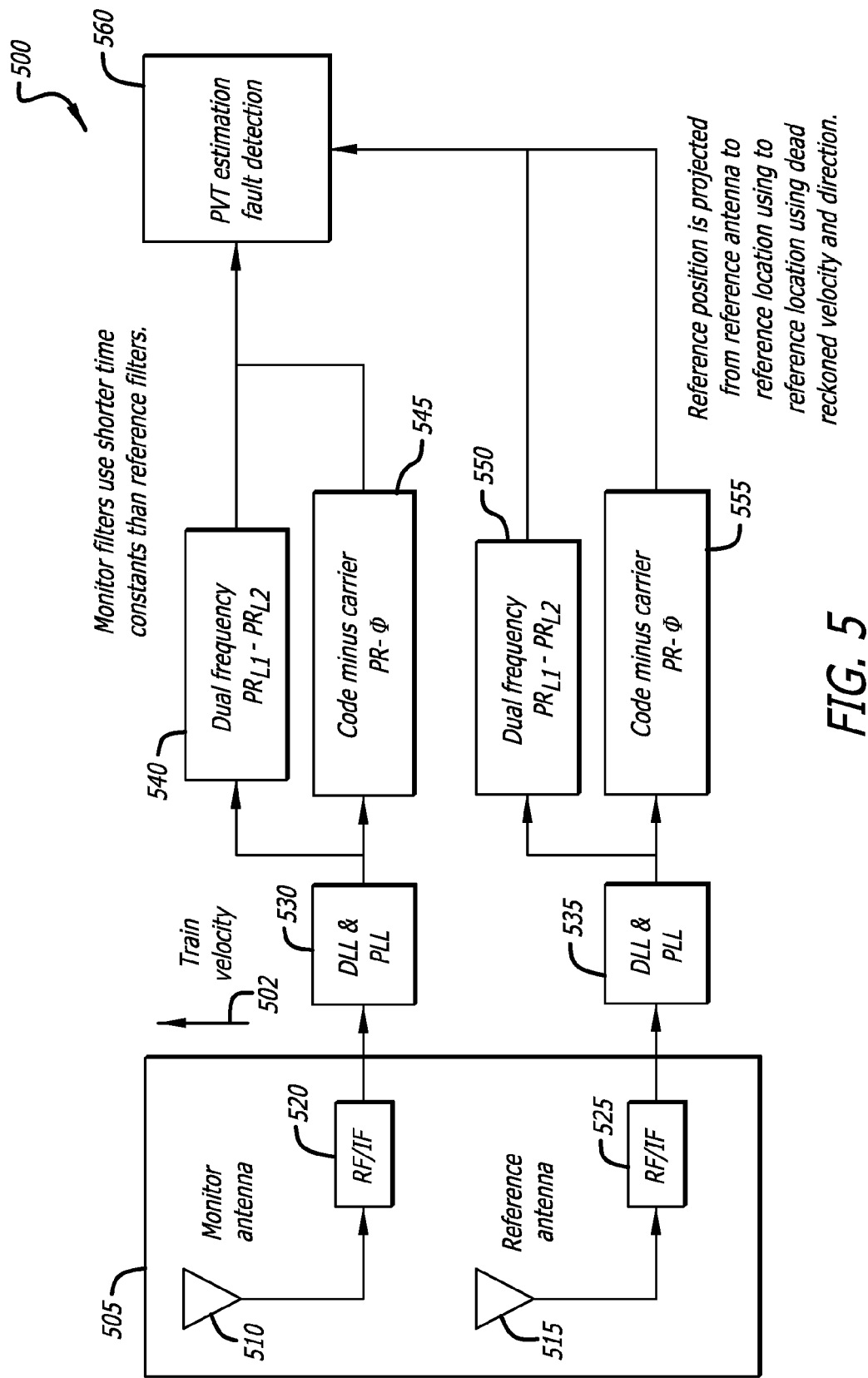
FIG. 5 is a diagram of an exemplary receiver and processor design for the disclosed system for multipath isolation through the combined use of antenna diversity and frequency diversity, in accordance with at least one embodiment of the present disclosure.

FIG. 14A through 14D, when viewed together, show the resulting outputs, derived by analysis, for the various stages of the processing that occurs in the exemplary receiver and processor design of FIG. 5, in accordance with at least one embodiment of the present disclosure.

Figure 15A:
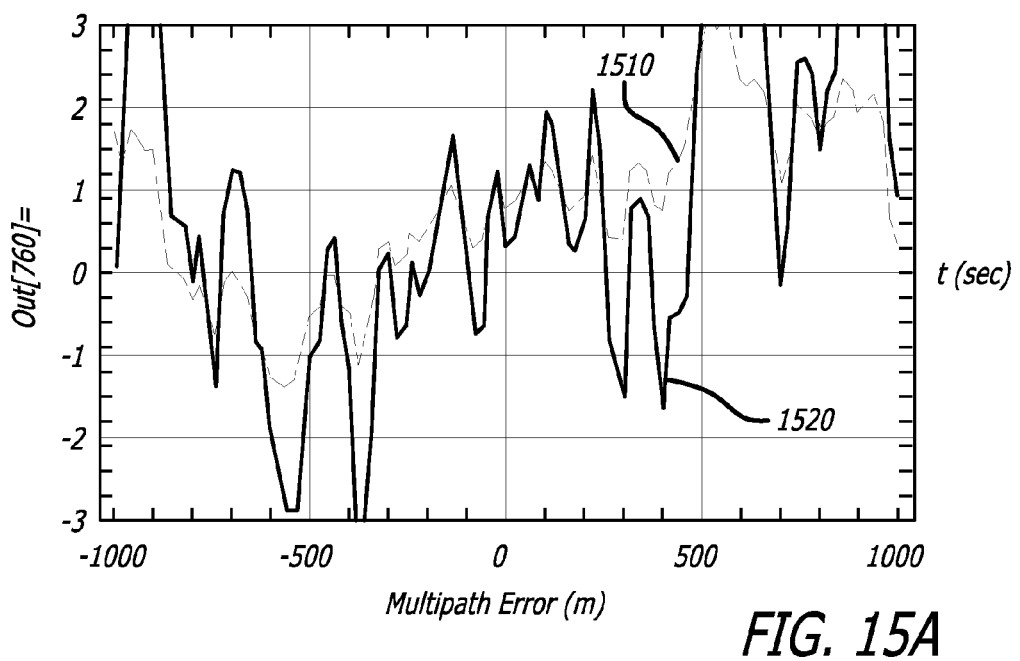
Figure 15B:
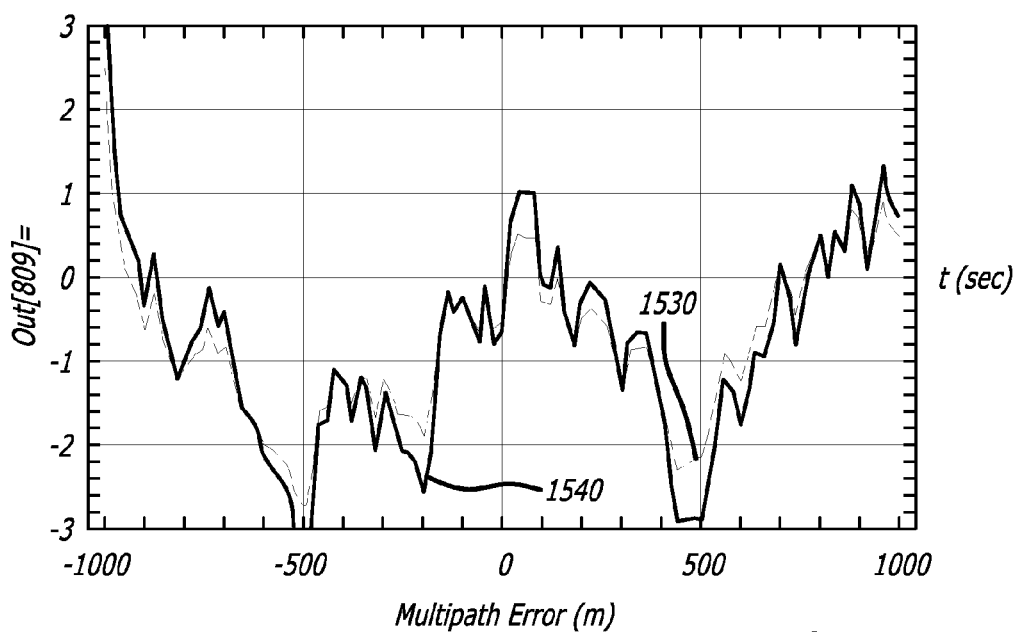

FIGS. 15A and 15B are graphs showing traces that represent random samples of multipath error generated using the mathematical model for analysis of FIG. 6, in accordance with at least one embodiment of the present disclosure.

Figure 16A:
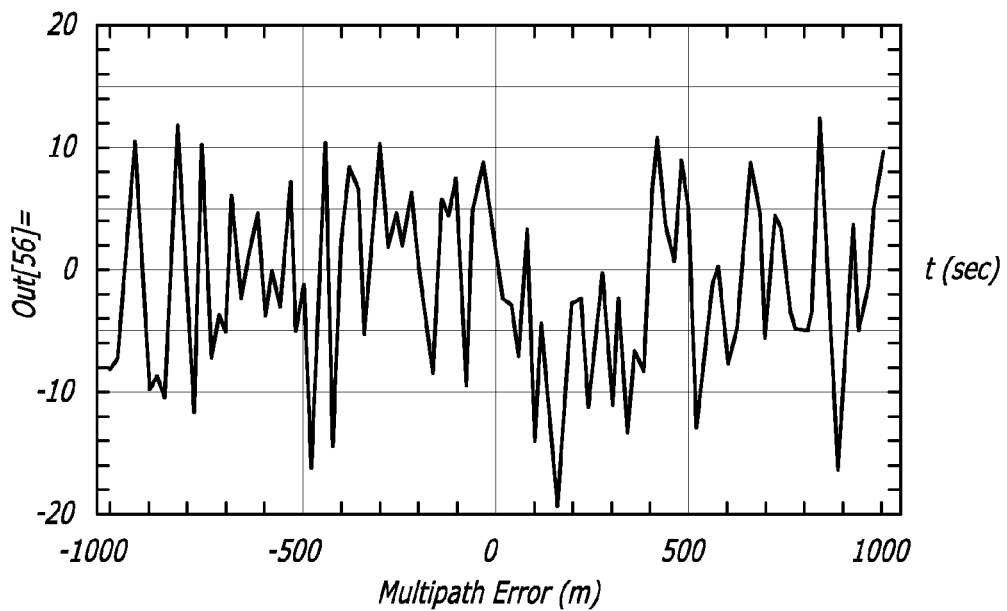

FIG. 16A is a graph showing the pre-filter multipath errors for different low pass filter time constants when the disclosed system is employed by a train that is moving slowly next to a smooth wall, in accordance with at least one embodiment of the present disclosure.

Figure 16B:
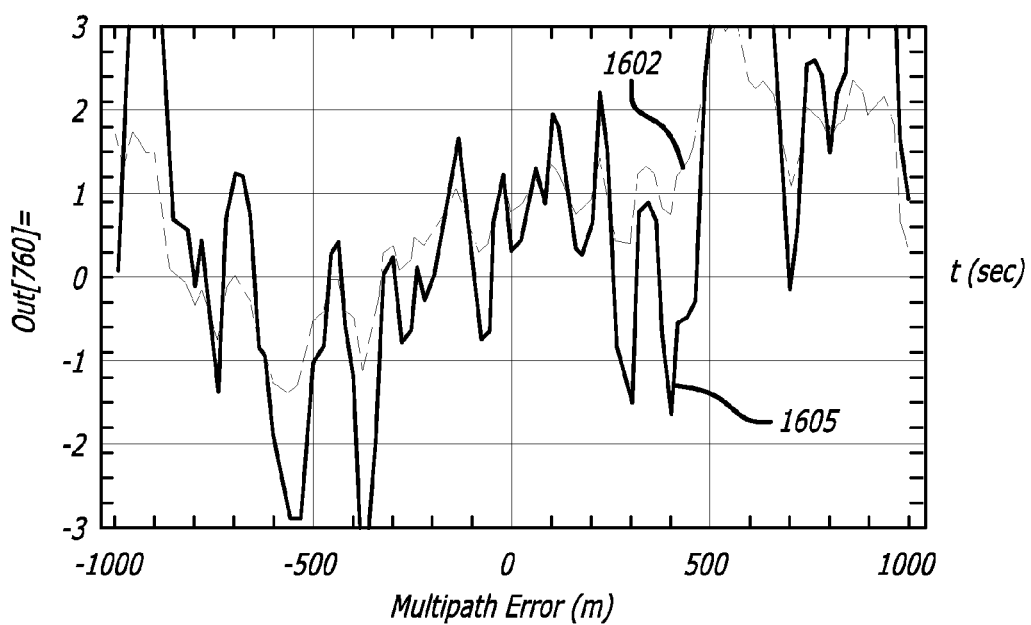

FIG. 16B is graph showing the post-filter multipath errors for different low pass filter time constants when the disclosed system is employed by a train that is moving slowly next to a smooth wall, in accordance with at least one embodiment of the present disclosure.

Figure 16C:
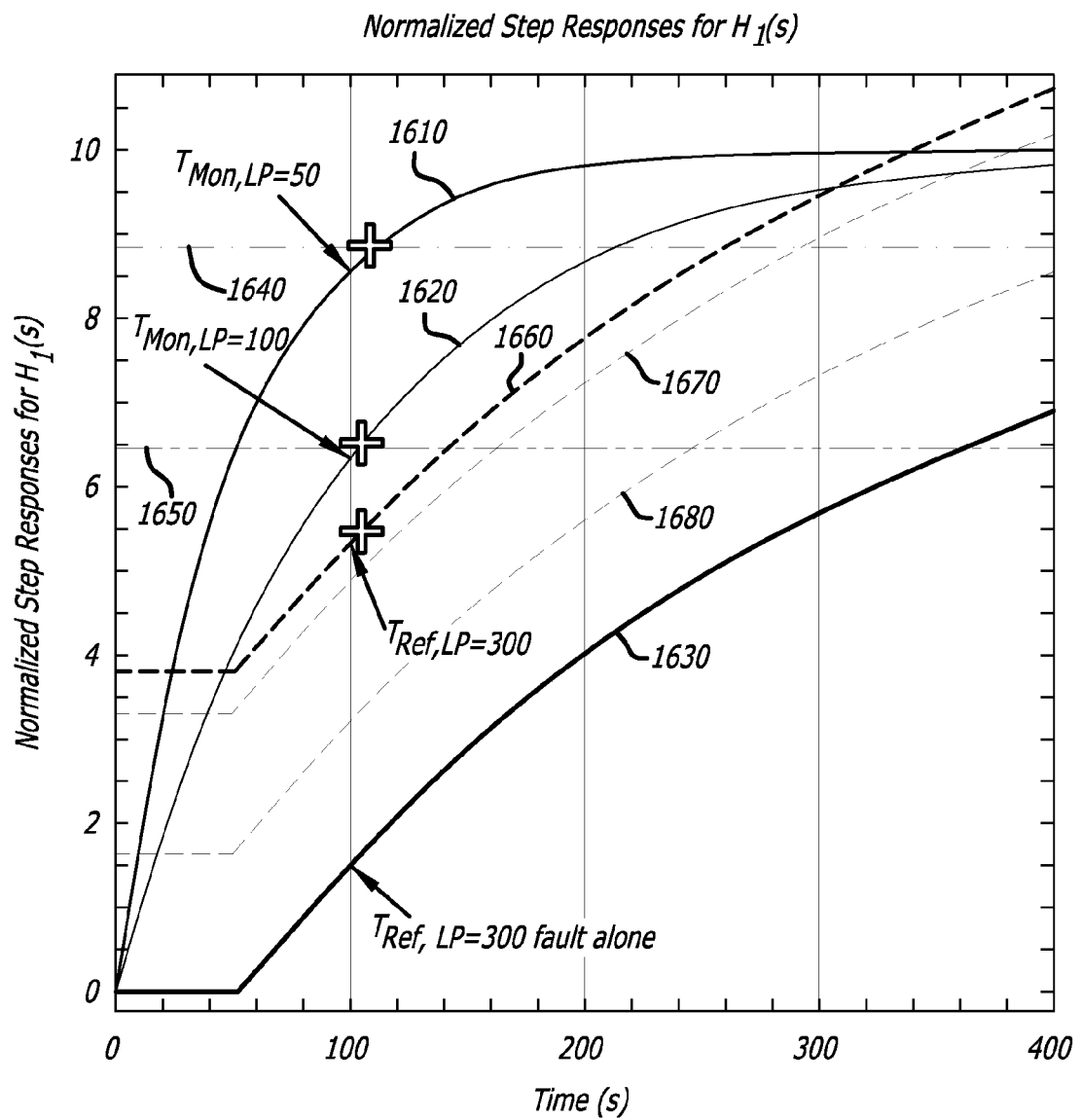

FIG. 16C is graph showing the step responses for low pass filters, with different time constants, for the monitor receiver and for the reference receiver when the disclosed system is employed by a train that is moving slowly next to a smooth wall, in accordance with at least one embodiment of the present disclosure.

Figure 17A:
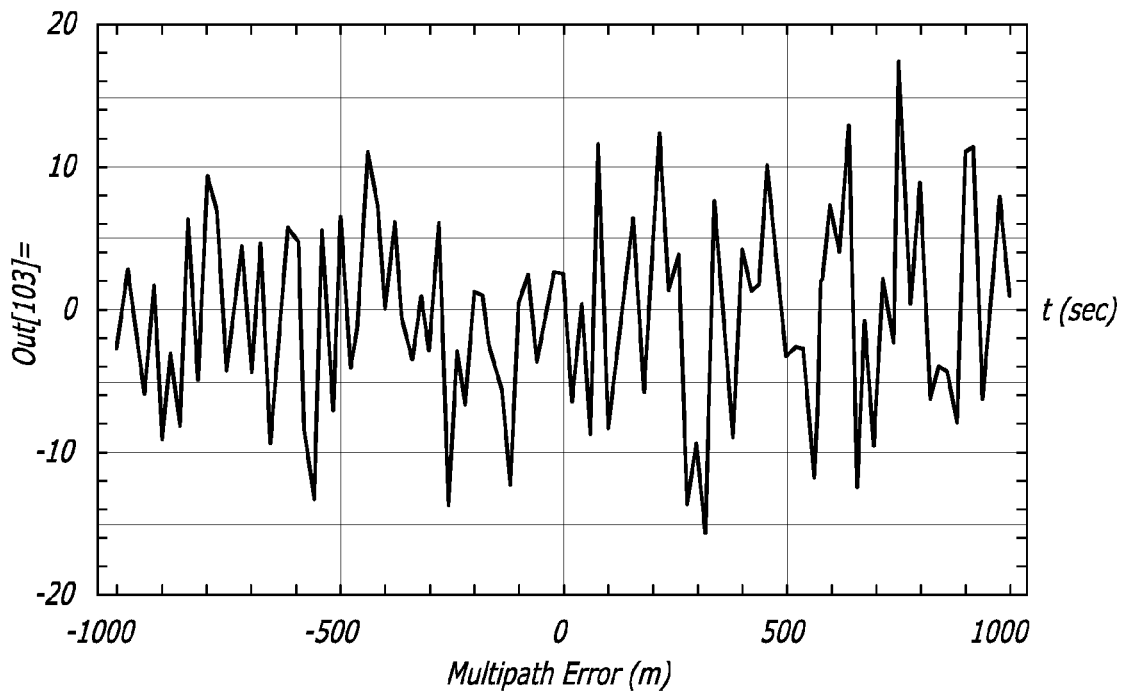

FIG. 17A is a graph showing the pre-filter multipath errors for different low pass filter time constants when the disclosed system is employed by a train that is moving fast next to a smooth wall, in accordance with at least one embodiment of the present disclosure.

Figure 17B:
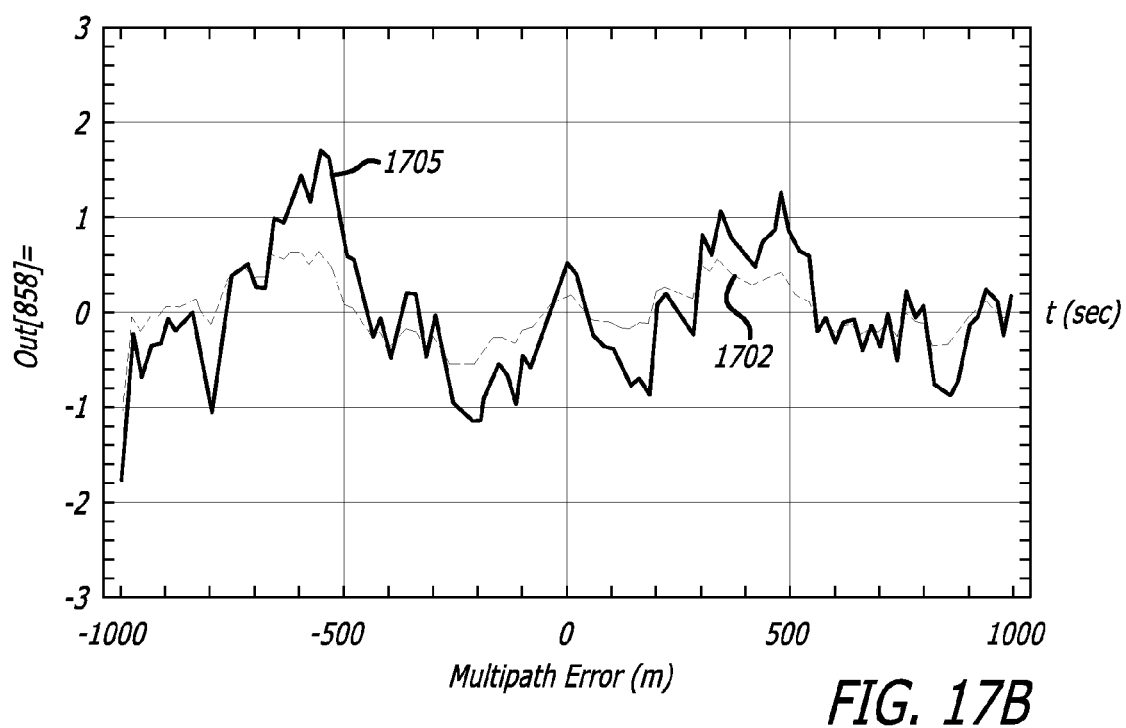

FIG. 17B is graph showing the post-filter multipath errors for different low pass filter time constants when the disclosed system is employed by a train that is moving fast next to a smooth wall, in accordance with at least one embodiment of the present disclosure.

Figure 17C:
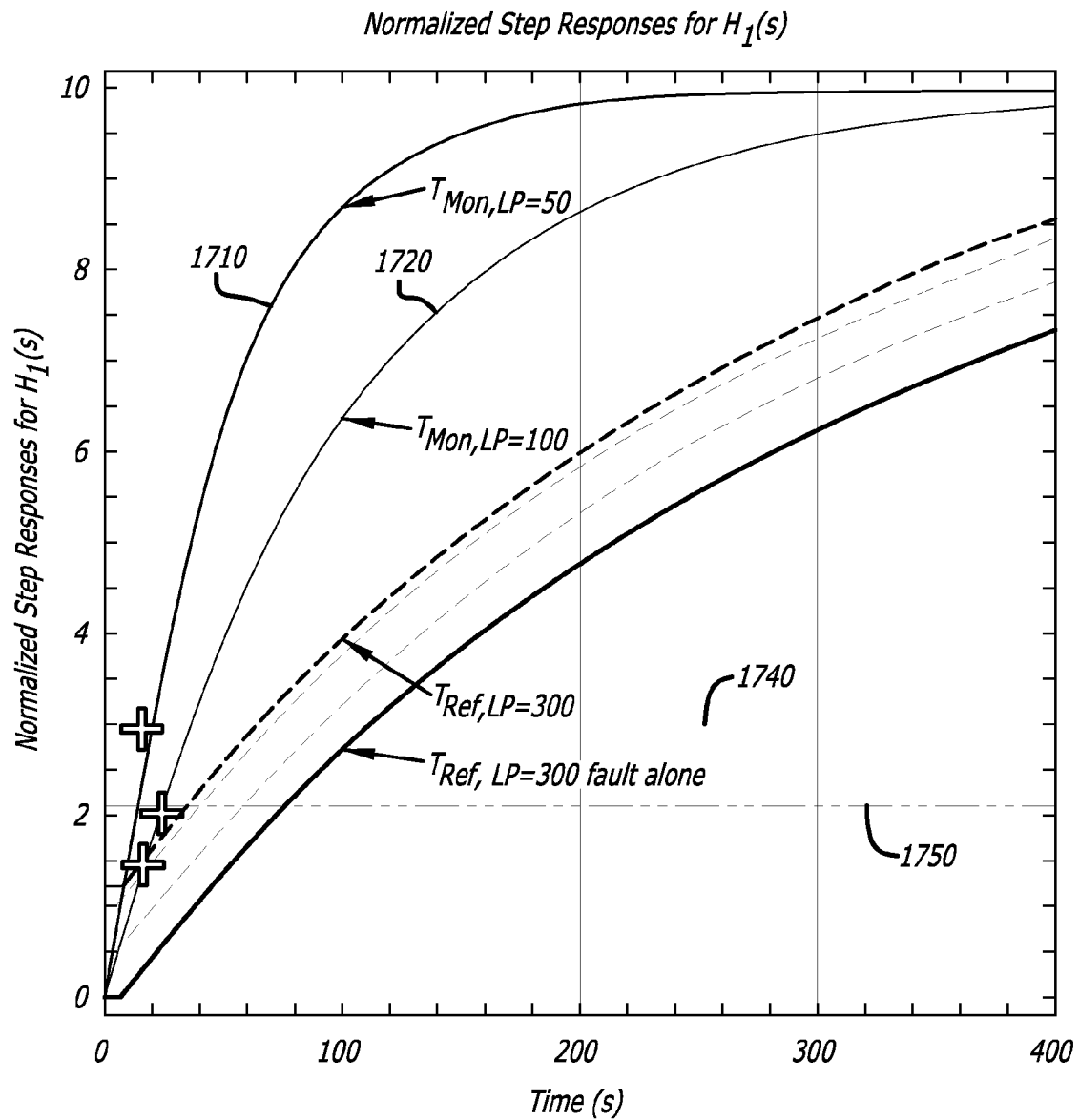

FIG. 17C is graph showing the step responses for low pass filters, with different time constants, for the monitor receiver and for the reference receiver when the disclosed system is employed by a train that is moving fast next to a smooth wall, in accordance with at least one embodiment of the present disclosure.

Figure 18A:
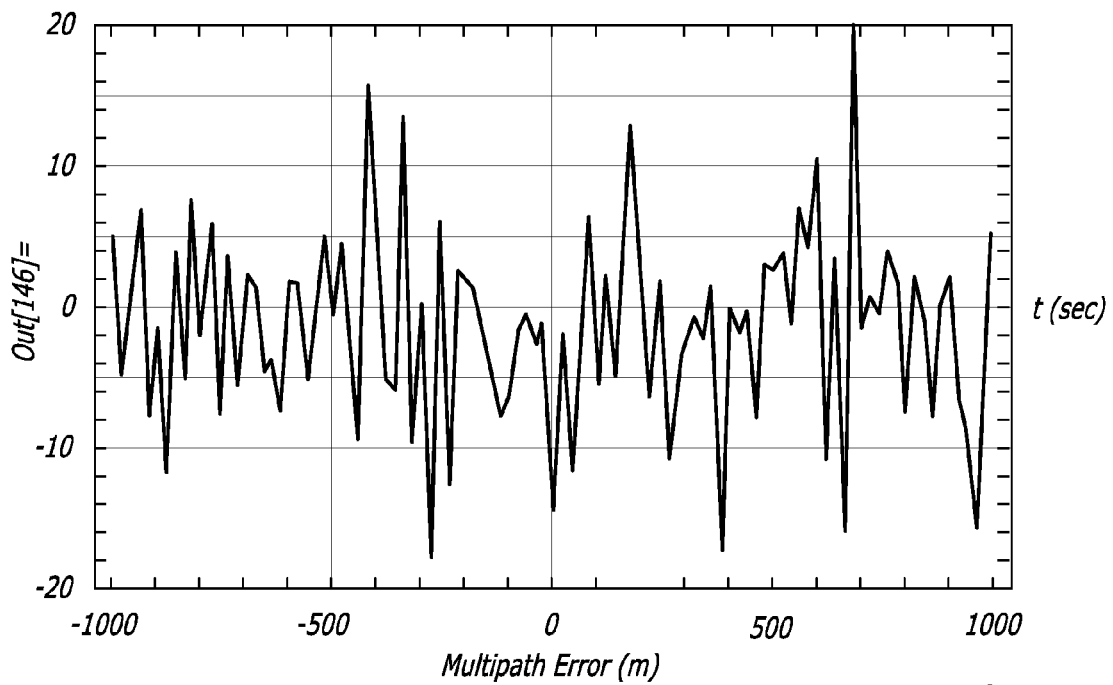

FIG. 18A is a graph showing the pre-filter multipath errors for different low pass filter time constants when the disclosed system is employed by a train that is moving fast next to a rough wall, in accordance with at least one embodiment of the present disclosure.

Figure 18B:
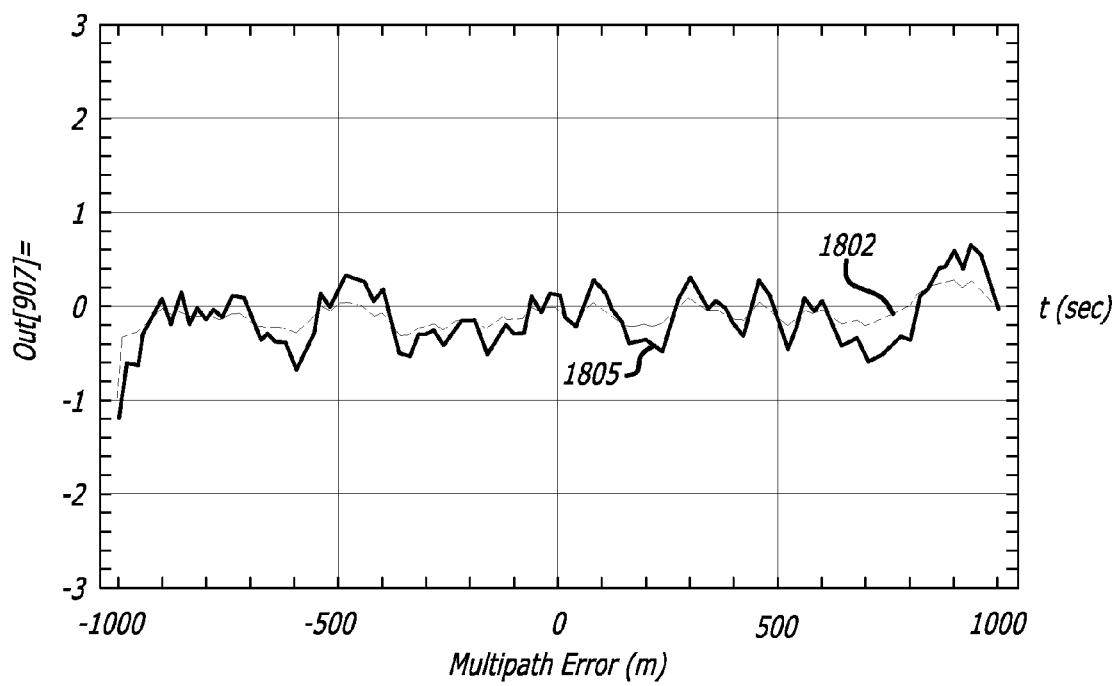

FIG. 18B is graph showing the post-filter multipath errors for different low pass filter time constants when the disclosed system is employed by a train that is moving fast next to a rough wall, in accordance with at least one embodiment of the present disclosure.

Figure 18C:
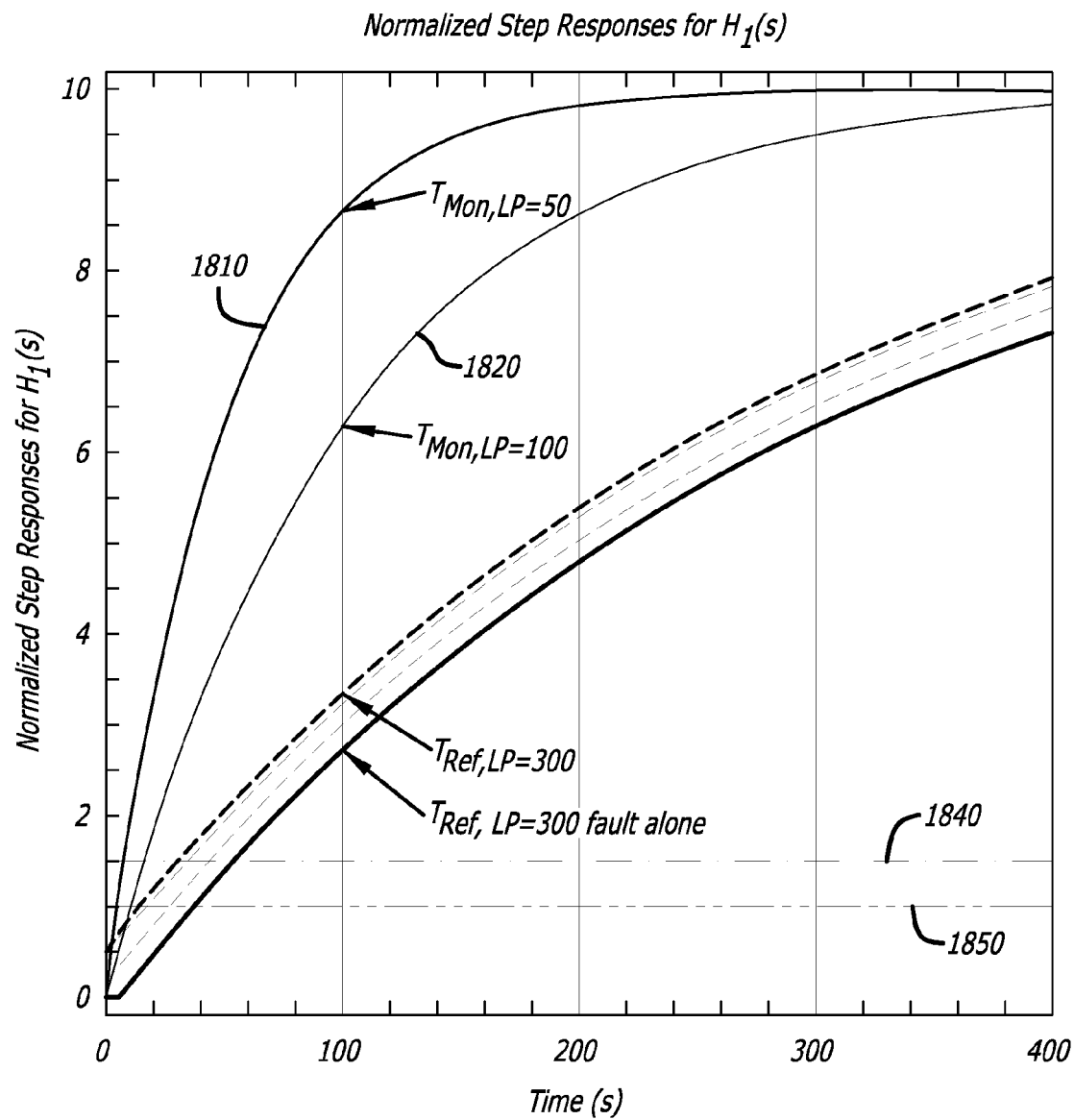

FIG. 18C is graph showing the step responses for low pass filters, with different time constants, for the monitor receiver and for the reference receiver when the disclosed system is employed by a train that is moving fast next to a rough wall, in accordance with at least one embodiment of the present disclosure.

Figure 19A:
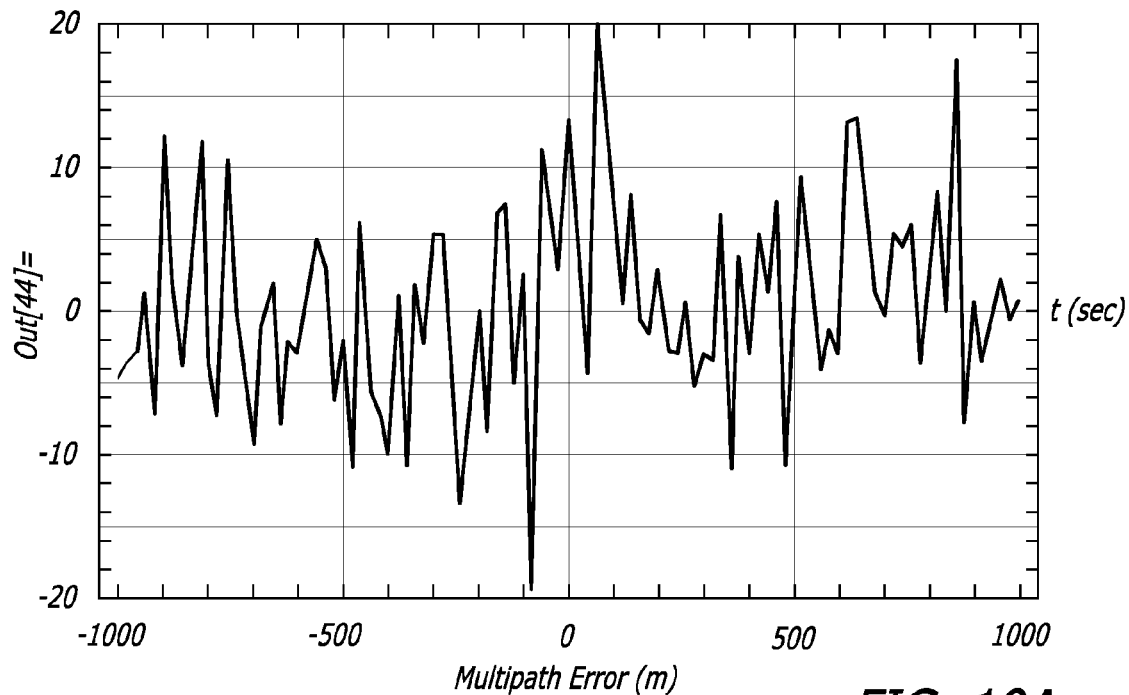

FIG. 19A is a graph showing the pre-filter multipath errors for different low pass filter time constants when the disclosed system is employed by a train that is moving slowly next to a rough wall, in accordance with at least one embodiment of the present disclosure.

Figure 19B:
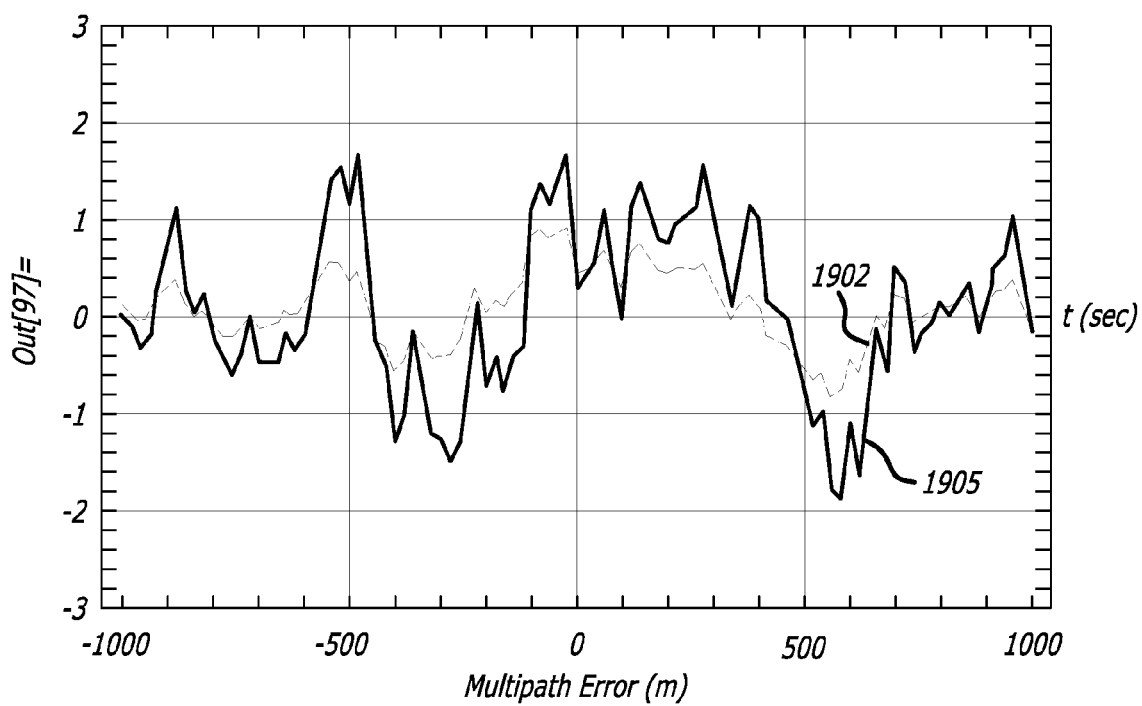

FIG. 19B is graph showing the post-filter multipath errors for different low pass filter time constants when the disclosed system is employed by a train that is moving slowly next to a rough wall, in accordance with at least one embodiment of the present disclosure.

Figure 19C:
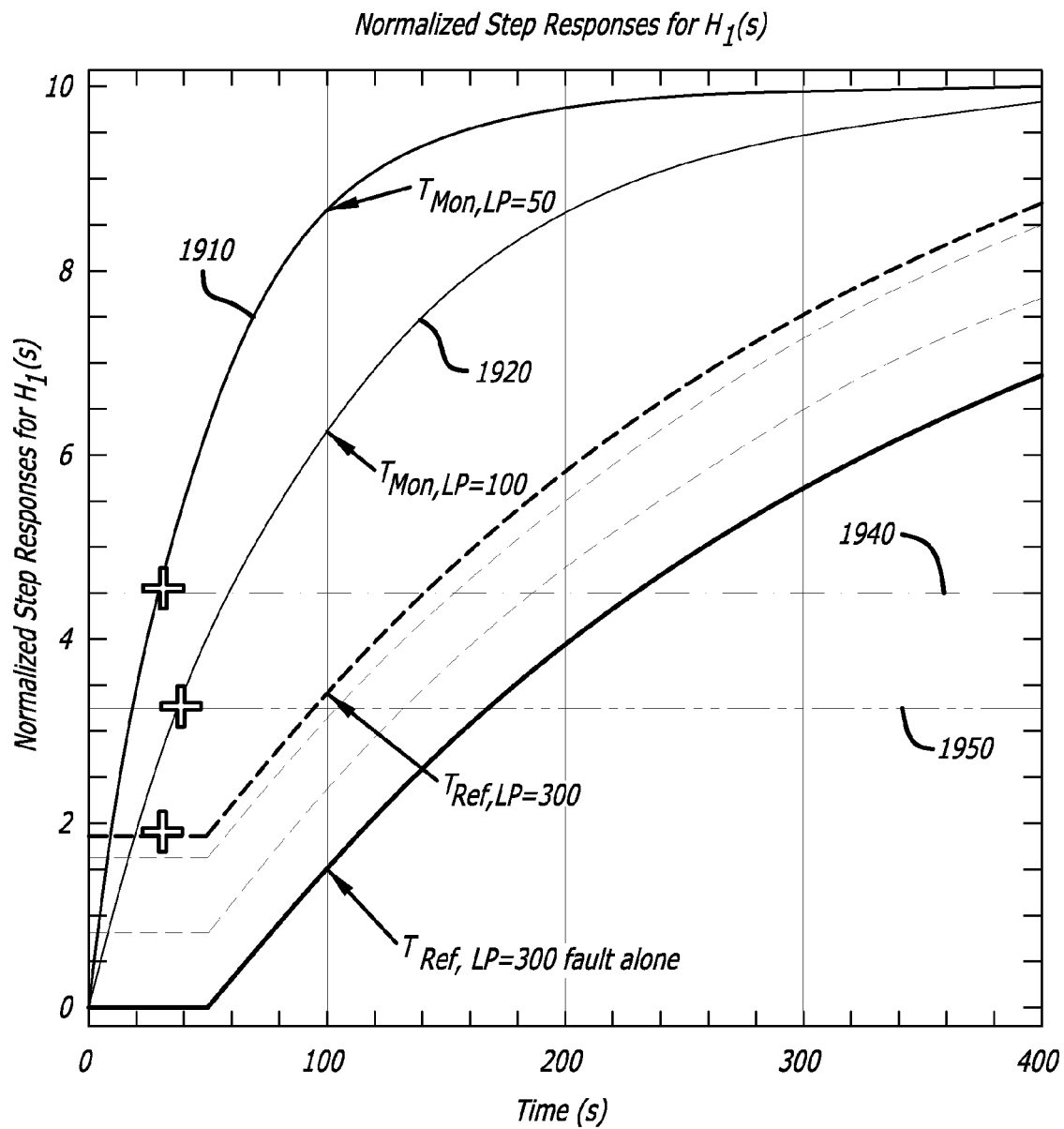

FIG. 19C is graph showing the step responses for low pass filters, with different time constants, for the monitor receiver and for the reference receiver when the disclosed system is employed by a train that is moving slowly next to a rough wall, in accordance with at least one embodiment of the present disclosure.

DESCRIPTION

The methods and apparatus disclosed herein provide an operative system for multipath isolation through the combined use of antenna diversity and frequency diversity and sensing of vehicle velocity and direction. In particular, the present disclosure teaches a system, method, and apparatus for extending the benefit of satellite navigation to safety critical users that operate in the presence of reflected signals. The present disclosure uses antenna diversity and frequency diversity to combat the deleterious effects of reflected signals on the positioning accuracy of satellite navigation systems. One or more embodiments of the present disclosure employ two antennas and two frequencies for operation with a satellite navigation system, such as the Global Navigation Satellite Systems (GNSS). The present disclosure segregates the antennas and frequencies into two classes: references and monitors. The reference measurements are used for estimating the vehicle state, which includes position, velocity, and time offsets. These estimates can be projected to any location on the vehicle through the use of inexpensive dead reckoning measurements. The monitor measurements are used to detect faults that might degrade the reference estimator. The monitor is able to anticipate these bad effects by careful placement of the monitor antenna relative to the reference antenna, and by using a shorter time constant than those used by the reference. As such, the present disclosure enables an improvement in the positioning error experienced by roving users in downtown and indoor environments. Applications for the disclosed system and method include positive train control, airport surface guidance, automotive lane keeping, and marine craft navigation in canals and ports.

As previously mentioned above, the disclosed system and method of the present disclosure may be used improve the positioning accuracy of existing satellite navigation systems. Satellite navigation serves a wide breadth of applications. Currently, most of this utility is based on satellites that belong to the Global Positioning System (GPS), which was originally developed by the United States Department of Defense (DOD). This development began in the 1970's when the planners predicted that GPS would serve a total of 40,000 military users and have some ancillary civil use. Today, the civil community ships over ten million GPS receivers per month, and this civil use has generated a remarkable breadth of applications.

For example, all new Boeing or Airbus aircraft carry a GPS receiver for navigation in the enroute and terminal area airspace. GPS is also used to guide aircraft while approaching airports. Together with augmentation, GPS estimates the aircraft altitude down to 200 feet above the ground. This application is certainly safety critical, but the aircraft antennas for GPS are mounted on top of the fuselage and, thus, are unlikely to receive signals that have been reflected from the ground or nearby buildings.

In addition, most new smart phones or feature phones carry GPS receivers that have a bill of materials of around $1. These receivers are used to guide us in our walking and driving lives. They can also provide our location automatically to emergency services when we make such a call. In time, they will be able to provide our location to good Samaritans standing next to automatic electronic defibrillators when someone suffers a heart attack. GPS receivers in cell phones will also serve significantly less uplifting applications, such as ones that push advertising to our phones based on our location. It should be noted that other GPS applications include ship navigation, pointing information for spacecraft, land survey, energy exploration, and time transfer for telecommunications, power delivery, and financial transactions.

Attracted by this utility, countries all over the world are investing in satellite navigation systems. For example, Russia is rejuvenating their satellite navigation system, called GLONASS; China is expanding their regional system, Beidou (also known as Compass), to include global coverage; Europe has launched their first prototype satellites for the Galileo system; and Japan and India have both launched satellites for their regional systems. Taken together, all of these systems will constitute a Global Navigation Satellite System (GNSS) with over one hundred satellites in medium Earth orbit (MEO).

The multiplicity of satellites described above will provide geometric diversity. In addition, the new satellites will provide frequency diversity for civil users. For example, each new GPS satellite radiates civil signals at three frequencies rather than the single civil frequency offered by the first two generations of GPS satellites. The new satellites broadcast at three civil frequencies: L1, L2 and L5. The new constellations from Europe, China, Russia, and Japan will also offer three frequencies (or more). Taken together, these frequencies provide redundancy to combat accidental radio frequency interference (RFI) and a means to remove the dispersive delay due to the ionosphere. Both features are important because RFI is becoming more prevalent in the GPS bands, and the ionosphere is the largest natural error source.

Other types of satellites have been developed that offer a variety of orbital diversity. An example of other types of satellites are Low Earth Orbiting (LEO) satellites. The MEO satellites, described above, have altitudes of approximately 20,000 kilometers (km), while LEO satellites have much lower altitudes of approximately 1000 km. By virtue of this low altitude, the LEO satellites will have much higher signal powers than the MEO satellites, and they will sweep across the user's sky more quickly. As such, we can envision a future set of LEO and MEO navigation satellites that provide geometric diversity. The user will then have an unprecedented set of information-bearing rays radiating from space.

This future mixture of LEO and MEO opens an extremely important new window of applications: safety-critical terrestrial navigation. These applications include, but are not limited to, positive train control, airport surface guidance, automotive lane keeping, and marine craft navigation in canals and ports. Positive train control (PTC) requires high quality navigation because the position information is being used to determine which track a train is on. If the tracks are within a few meters of each other, then position errors greater than a few meters cannot be tolerated. Any situation that might encourage large position errors must be detected within seconds. As such, the navigation system for PTC must have integrity. Airport surface navigation also requires high integrity navigation to prevent runway collisions. Automotive lane keeping also requires any errors that are large compared to a roadway width to be detected and mitigated. In addition, navigation of marine craft in canals and ports also requires high integrity navigation to avoid any collisions with nearby canal walls or boats.

High integrity navigation systems for aviation have been built. However, high integrity navigation systems for terrestrial applications, such as those described above, have not been built. The latter are difficult to build because the predominant error source is multipath, which is strong in environments that encourage signal reflections. If the signal arrives by multiple paths, then the reflected rays interfere with the direct ray. In airborne applications, reflected rays are not present or very weak. In terrestrial applications, reflected rays become the main source of error. Therefore, there is a need for a satellite navigation system that can detect and mitigate errors due to multipath. Such a system is needed to support positive train control, airport surface guidance, automotive lane keeping, marine craft navigation, and other safety-critical terrestrial applications.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
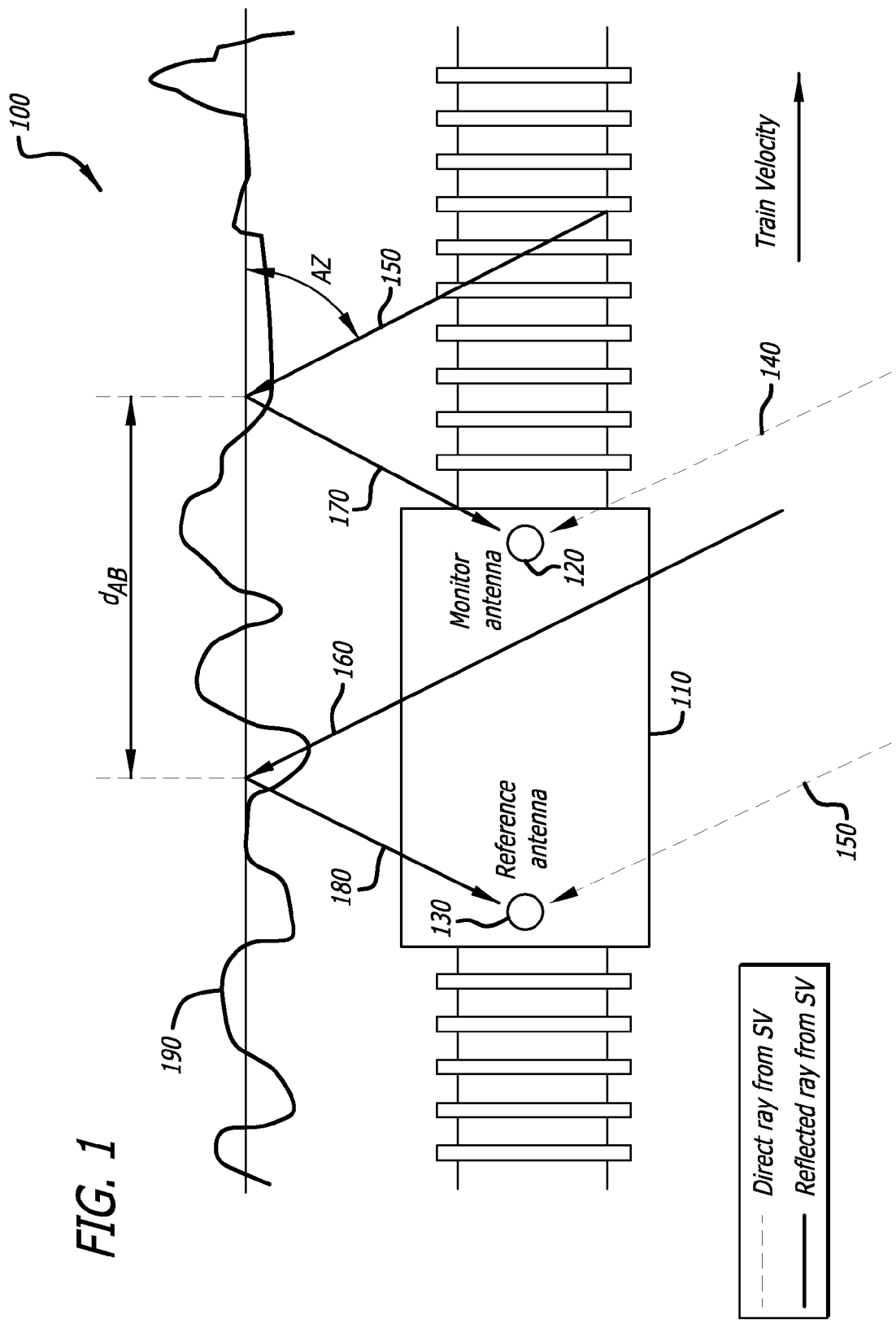
FIG. 1 is a diagram of the disclosed system for multipath isolation through the combined use of antenna diversity and frequency diversity where a single train car is employing the system, in accordance with at least one embodiment of the present disclosure. The railway track dictates that the reference antenna will move through locations formally occupied by the monitor antenna.

FIG. 1 is a diagram of the disclosed system 100 for multipath isolation through the combined use of antenna diversity and frequency diversity where a single train car 110 is employing the system, in accordance with at least one embodiment of the present disclosure. In this figure, two antennas 120, 130 are shown to be placed on the train 110. Either or both of these antennas 120, 130 may receive signals of one or more frequencies. Both of these antennas 120, 130 receive direct satellite navigation signals 140, 150, respectively, and multipath signals 170, 180, which are reflections of satellite navigation signals 150, 160 reflecting off a rough wall structure 190. In one or more embodiments, the satellite navigation signals are transmitted from at least one LEO satellite, MEO satellite, and/or GEO satellite.

The antenna 120 on the front of the train 110 is referred to as a monitor antenna 120. The monitor antenna 120 is used to detect on-coming multipath events before they effect the navigation information generated by the reference antenna 130, which is mounted on the rear of the train 110. The location of the monitor antenna 120 and the location of the reference antenna 130 are relative to one another. In one or more embodiments, the monitor antenna 120 is mounted on the train 110 at a location directly in front of the reference antenna 130 such that the monitor antenna 120 and the reference antenna 130 are in alignment with one another along the length of the train 110. When the two antennas 120, 130 are mounted on the train 110 such that they are aligned with one another along the length of the train 110, as the train 110 moves along a straight train track, the reference antenna 130 will be located at the same position as the monitor antenna 120 was located at an earlier time. Moreover, some of the embodiments of our invention include dead reckoning measurements that enable the processor to determine exactly when the reference antenna is occupying the previous location of the monitor antenna.

The location of the reference antenna 130 is estimated by the reference receiver (not shown). This antenna location is projected to any navigation location on the train 110 based on estimates of the train velocity and direction provided by inexpensive dead reckoning or inertial measurements. The location estimated by the reference receiver (not shown) is protected from the effects of multipath by the data from the monitor receiver (not shown) that is processing signals from the monitor antenna 120.

As previously mentioned, the front monitor antenna 120 should experience the oncoming multipath environment before the rear reference antenna 130. The multipath errors will include background noise due to a collection of weak reflections. This is referred to as diffuse multipath. From time to time, a strong reflection will arise. This stronger reflection is called a specular reflection, and it typically results from a signal reflecting off of a more nearly mirror-like reflecting surface. The signal data obtained by the monitor antenna 120 is processed by a processor (not shown) to identify satellites that are experiencing specular reflections and to remove them from the suite of satellite measurements used by the reference receiver (not shown).

Figure 2:
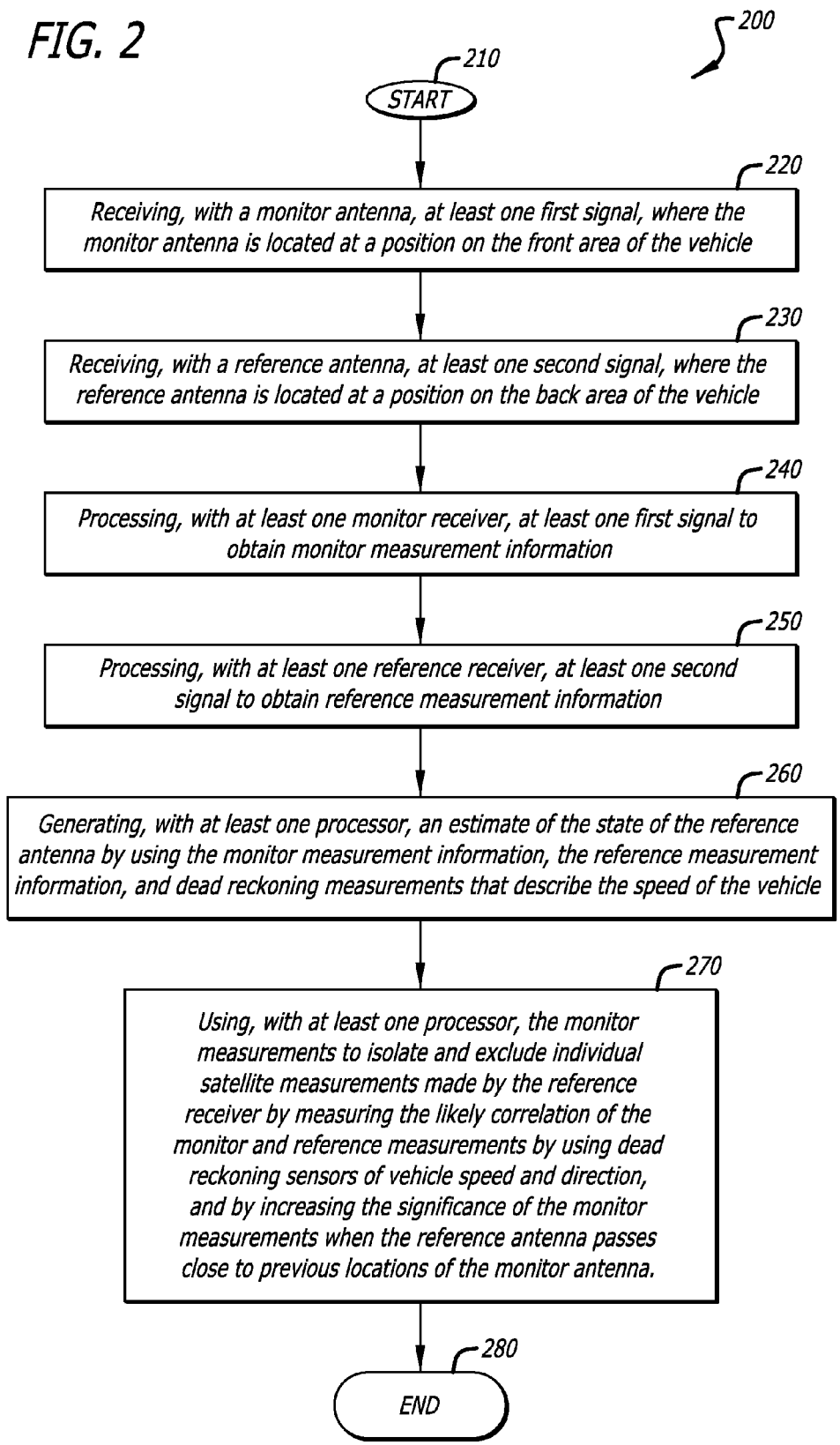
FIG. 2 is a flow diagram of the disclosed method for multipath isolation through the combined use of antenna diversity and frequency diversity where a single train car is employing the method, in accordance with at least one embodiment of the present disclosure.

FIG. 2 is a flow diagram 200 of the disclosed method for multipath isolation through the combined use of antenna diversity and frequency diversity where a single vehicle or train car (e.g., locomotive or caboose) is employing the method, in accordance with at least one embodiment of the present disclosure. At the start 210 of the method, a monitor antenna receives at least one first signal, where the monitor antenna is located at a position on the front area of the vehicle 220. A reference antenna receives at least one second signal, where the reference antenna is located at a position on the back area of the vehicle 230. Then, at least one monitor receiver processes at least one received first signal to obtain monitor measurement information 240. Also, at least one reference receiver processes at least one received second signal to obtain reference measurement information 250. At least one processor then generates an estimate of the state of the reference antenna (e.g., the position of the vehicle, the velocity of the vehicle, and the time offsets for the vehicle) by using: the monitor measurement information, the reference measurement information, and dead reckoning measurements that describe the speed of the vehicle 260. Then, at least one processor uses the monitor measurements to isolate and exclude individual satellite measurements made by the reference receiver by measuring the likely correlation of the monitor and reference measurements by using dead reckoning sensors of vehicle speed and direction, and by increasing the significance of the monitor measurements when the reference antenna passes close to previous locations of the monitor antenna 270. If the reference antenna is known to pass through a previous monitor location, then the reference and monitor measurements are highly correlated with each other. As an example, the reference antenna is known to pass through the previous locations of the monitor antenna when both are mounted on top of a railway car. In these cases, the exclusion algorithm should be highly sensitive to the monitor measurements because they are known to be very reliable indicators of the reference errors. In some cases, the reference antenna may not pass through a previous monitor location, but the speed and direction measurements may indicate that it passes near to the previous locations of the monitor antenna. In these cases, the exclusion algorithm should be less sensitive to the monitor measurements because the correlation is weaker. For the disclosed method, the distances between the reference antenna and previous locations of the monitor antenna are continuously measured using dead reckoning sensors of the vehicle speed and direction. If the reference antenna is known to be far from any previous location of the monitor antenna, then the detection algorithm should not significantly consider the monitor measurements. Then, the method ends 280.

Figure 3:
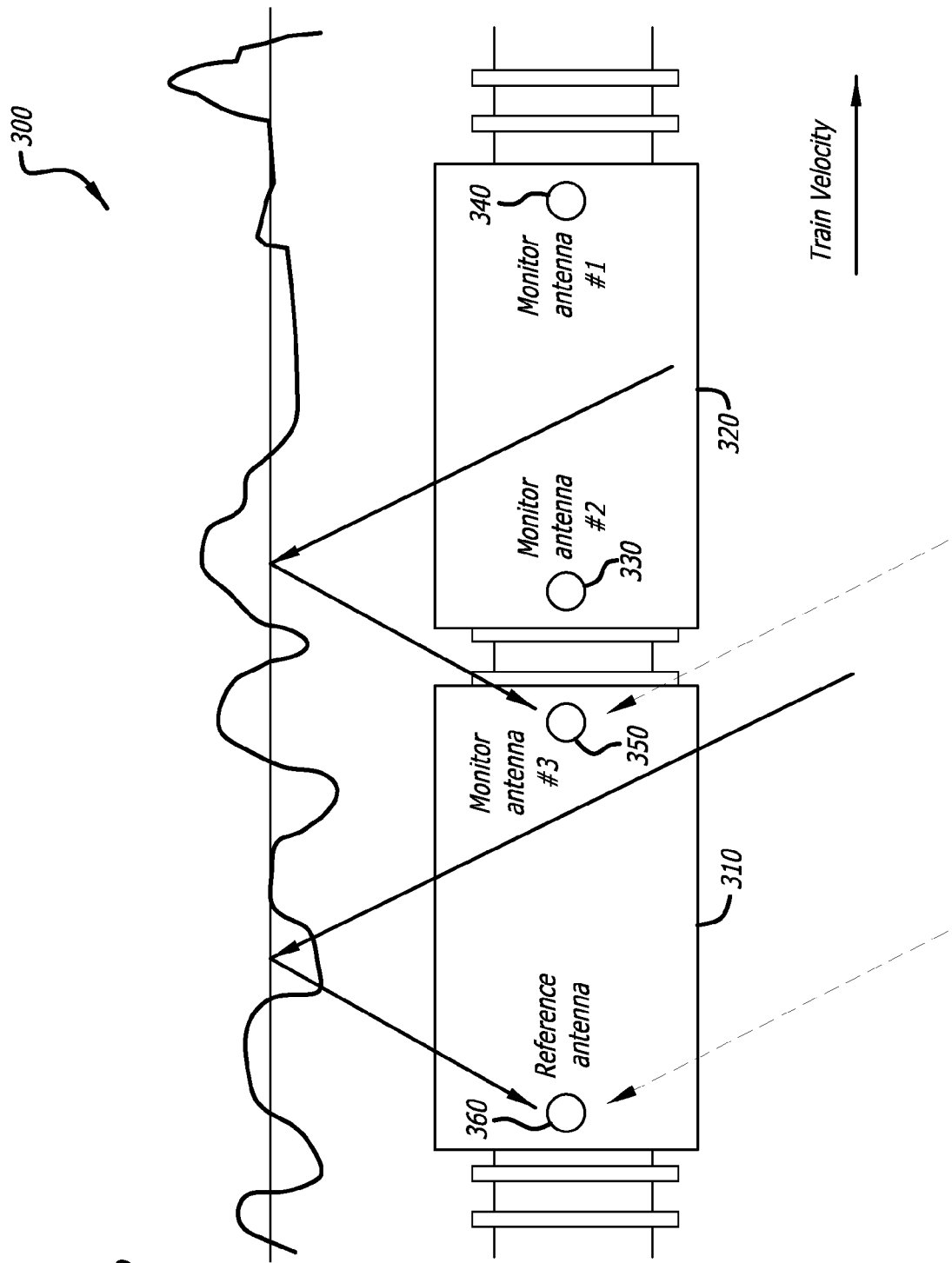
FIG. 3 is a diagram of the disclosed system for multipath isolation through the combined use of antenna diversity and frequency diversity where two train cars ganged together are employing the system, in accordance with at least one embodiment of the present disclosure.

FIG. 3 is a diagram of the disclosed system 300 for multipath isolation through the combined use of antenna diversity and frequency diversity where two train cars 310, 320 ganged together are employing the system, in accordance with at least one embodiment of the present disclosure. In this figure, two train cars 310, 320 are shown to be ganged together. When two or more cars 310, 320 are ganged together, additional monitor antennas 330, 340 may be placed on the additional car 320 to improve the satellite navigation system performance. All of the monitor antennas 330, 340, 350 may contribute to the monitoring function. The additional monitor antennas 330, 340 allow for an even earlier identification of multipath. The additional monitor antennas 330, 340 may also contribute to the estimation of the location of the reference antenna 360 because the relative velocity and heading of the additional train car can also be estimated from measurements of heading and velocity.

Figure 4:
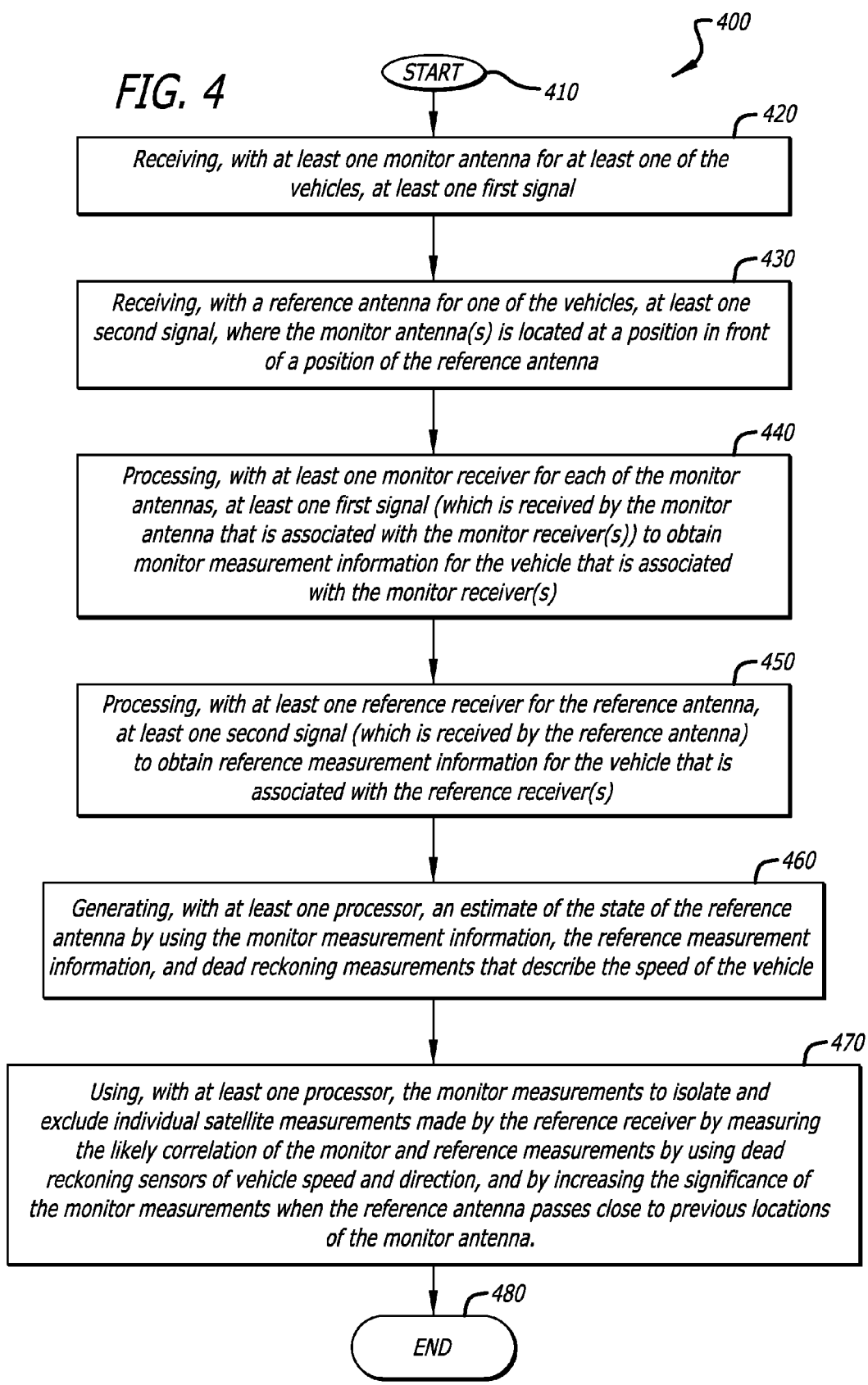
FIG. 4 is a flow diagram of the disclosed method for multipath isolation through the combined use of antenna diversity and frequency diversity where two trains ganged together are employing the method, in accordance with at least one embodiment of the present disclosure.

FIG. 4 is a flow diagram 400 of the disclosed method for multipath isolation through the combined use of antenna diversity and frequency diversity where two vehicles, or two trains, ganged together are employing the method, in accordance with at least one embodiment of the present disclosure. At the start 410 of the method, at least one monitor antenna, for at least one of the vehicles, receives at least one first signal 420. A reference antenna for one of the vehicles receives at least one second signal. The monitor antenna(s) is located at a position in front of a position of the reference antenna 430. Then, at least one monitor receiver, for each of the monitor antennas, processes at least one first signal (which is received by the monitor antenna that is associated with the monitor receiver(s)) to obtain monitor measurement information for the vehicle that is associated with the monitor receiver(s) 440. Also, at least one reference receiver for the reference antenna processes at least one second signal (which is received by the reference antenna) to obtain reference measurement information for the vehicle that is associated with the reference receiver(s) 450. Then, at least one processor generates an estimate of the state of the reference receiver by using: the monitor measurement information, the reference measurement information, and dead reckoning measurements that sense the speed of the vehicle(s) 460. Then, at least one processor uses the monitor measurements to isolate and exclude individual satellite measurements made by the reference receiver by measuring the likely correlation of the monitor and reference measurements by using dead reckoning sensors of vehicle speed and direction, and by increasing the significance of the monitor measurements when the reference antenna passes close to previous locations of the monitor antenna 470. If the reference antenna is known to pass through a previous monitor location, then the reference and monitor measurements are highly correlated with each other. As an example, the reference antenna is known to pass through the previous locations of a monitor antenna when both are mounted on top of a railway car. In these cases, the exclusion algorithm should be highly sensitive to the monitor measurements because they are known to be very reliable indicators of the reference errors. In some cases, the reference antenna may not pass through a previous monitor location, but the speed and direction measurements may indicate that it passes near to the previous locations of a monitor antenna. In these cases, the exclusion algorithm should be less sensitive to the monitor measurements because the correlation is weaker. For the disclosed method, the distances between the reference antenna and previous locations of a monitor antenna are continuously measured using dead reckoning sensors of the vehicle speed and direction. If the reference antenna is known to be far from any previous location of a monitor antenna, then the detection algorithm should not significantly consider the monitor measurements. Then, the method ends 480.

FIG. 5 is a diagram of an exemplary receiver and processor design for the disclosed system for multipath isolation through the combined use of antenna diversity and frequency diversity, in accordance with at least one embodiment of the present disclosure. In this figure, a vehicle (e.g., a single train) 505 is shown to be heading in a North direction and, thus, the train velocity is indicated by the North-pointing arrow 502. The monitor antenna 510 and the reference antenna 515 receive the direct and multipath signals.

The monitor antenna 510 and the reference antenna 515 are shown to be respectively connected to processing sections that operate at the GNSS radio frequencies (RF) and suitable intermediate frequencies (IF). The RF/IF boxes 520, 525 represent the signal processing that occurs in the front end of any radio receiver inclusive of processing at the radio and intermediate frequencies. At this stage of the processing, the received RF signals are amplified and down converted to IF.

The RF/IF boxes 520, 525 are shown to be respectively connected to delay lock loop (DLL) and the phase lock loop (PLL) boxes 530, 535. The IF outputs from the RF/IF boxes 520, 525 are input into the DLL & PLL boxes 530, 535. The DLL & PLL boxes 530, 535 are simplified boxes that represent the receiver processing needed to correlate the incoming signals with internal replicas of the satellite signals. The DLL & PLL boxes 530, 535 form and track estimates of the time shift associated with the codes that modulate the satellite signals. They also track the frequency shift associated with the underlying radio carriers. They may also track the phase shift of the radio carriers from the satellites.

Post correlation, the measurements (i.e. outputs from the DLL & PLL boxes 530, 535) are processed to separate errors due to multipath from the normal measurement variation due to the motion of the vehicle 505 relative to the satellites. This is achieved by differencing the received dual frequencies in the dual frequency filters 540, 550 and differencing the code and carrier in the code minus carrier filters 545, 555. The output of all of these filters 540, 545, 550, 555 is then combined to estimate the position, velocity, and time offsets (PVT) 560 of the vehicle 505.

For a GPS embodiment of the present disclosure, the dual frequency filters 540, 550 could use the L1 and L2 frequencies, where L1=1575.42 megahertz (MHz) and L2=1227.6 MHz. Alternatively, the dual frequency filters 540, 550 could use the L1 and L5=1176.45 MHz frequencies or the L2 and L5 frequencies. The dual frequency filters 540, 550 could also use similar frequencies from GNSS. Another embodiment uses a triple frequency filter. In any of these cases, the user-to-satellite pseudorange is common to all frequencies, but multipath errors are independent (or nearly so) from frequency to frequency. Thus, the filter subtracts the pseudorange measured on one frequency from the pseudorange measured at the second frequency. This resulting difference is dominated by multipath.

For at least one embodiment of the system and method of the present disclosure, the filter time constant used by the monitor receiver is shorter than the filter time constant used by the reference receiver. As previously mentioned, the reference receiver develops the final position estimate of the vehicle, and the monitor receiver is designed to detect faults or rare normal events before they cause significant reference receiver errors. The monitor antenna 510 is located on the leading edge of the vehicle 505, and should experience these feared events earlier than the reference antenna 515. In addition, the monitor filters 540, 545 use shorter time constants than the reference filters 550, 555 and, thus, the monitor filters 540, 555 will respond more quickly than the reference filters 550, 555. Thus, these two features (i.e. the monitor antenna 510 being located on the leading edge of the vehicle 505, and the monitor filters 540, 545 using shorter time constants than the reference filters 550, 555) enable the monitor to anticipate trouble.

The code-minus-carrier filters 545, 555 shown in FIG. 5 are also configured to isolate multipath. The satellite-to-user pseudorange is common to the code measurements and the carrier measurements at any single frequency. Thus, the code and carrier measurements are differenced. This eliminates the underlying pseudorange component, and the resulting difference is dominated by the multipath in the code measurement. The difference is filtered. Once again, the monitor code minus carrier filter 545 would use shorter time constants than the reference code minus carrier filter 555.

In another embodiment of the present disclosure, the measurements from the reference antenna 515 are also used to monitor for worrisome faults and rare normal events. These reference measurements can be used instead of, or in addition to, measurements from the monitor antenna 510. They would still be able to anticipate worrisome effects on the reference location estimate by using shorter time constants.

FIG. 6 is a diagram 600 of the exemplary receiver and processor design of FIG. 5 showing the mathematical model for the analysis, in accordance with at least one embodiment of the present disclosure. As shown in this figure, the monitor and reference measurements are processed by two different chains (i.e. the upper monitor path and the lower reference path). The dual frequency pseudorange differences are processed by a low pass filter 540, 550. The transfer function for this filter 540, 550 is $H_{DF}[s]$. This model is widely accepted for the smoothing of such dual frequency differences, and leverages the removal of measurement dynamics by differencing and the use of carrier phase measurements. FIG. 7 shows the formulas for the transfer function $H_{DF}[s]$ for filters 540, 550, and for the transfer function $H_{CMC}[s]$ for filters 545, 555.

Band pass filtering creates the code-minus-carrier measurements, and this transfer function is $H_{CMC}[s]$. In this case, the numerator includes a single "s" term, which is the derivative needed to remove the unknown number of whole RF carrier cycles. In other words, the code-minus-carrier filter 545, 555 uses the carrier to remove the change in the pseudorange, and processes the rate of change of the code phase. Derivatives increase noise, so the derivative term is accompanied by the two smoothing terms with time constants BPa and BPb. $H_{DF}[s]$ has the impulse, step, and ramp responses as shown in FIG. 8. And, $H_{CMC}[s]$ has the impulse, step, and ramp responses as shown in FIG. 9.

Multipath is quite strong at the input of the above described filters 540, 545, 550, 555. At the output of the delay lock loop (DLL) 530, 535, the multipath error can easily be twenty (20) to thirty (30) meters (m) or more. The goal of the filters 540, 545, 550, 555 is to reduce this error to one meter or less. The DLL multipath error $M_{L1}(t)$ is modeled according to the formula in FIG. 10.

As shown in FIG. 10, the multipath error $M_{L1}(t)$ has an amplitude A. This amplitude depends on the reflection environment, antenna pattern, and correlator strategy used by the receiver. Multipath modulates the phase of this signal, and the phase modulation depends on the nominal distance to a reflecting surface. Phase modulation is also sensitive to the roughness of that surface.

Multipath introduces a random modulation of the phase of a sinusoid. The corresponding auto-correlation function Rmult [τ] is shown in FIG. 11. As shown in this figure, the auto-correlation function Rmult [τ] at the DLL output depends on the listed parameters in FIG. 11 plus the auto-correlation function Rm [τ] that describes the roughness of the reflecting surface. In addition, it should be noted that the DLL auto-correlation function Rmult [τ] may be expressed as an infinite series. In practice, this series converges slowly, and hundreds of terms are often employed. This approximation is utilized in the analysis further described below.

Figure 14A:
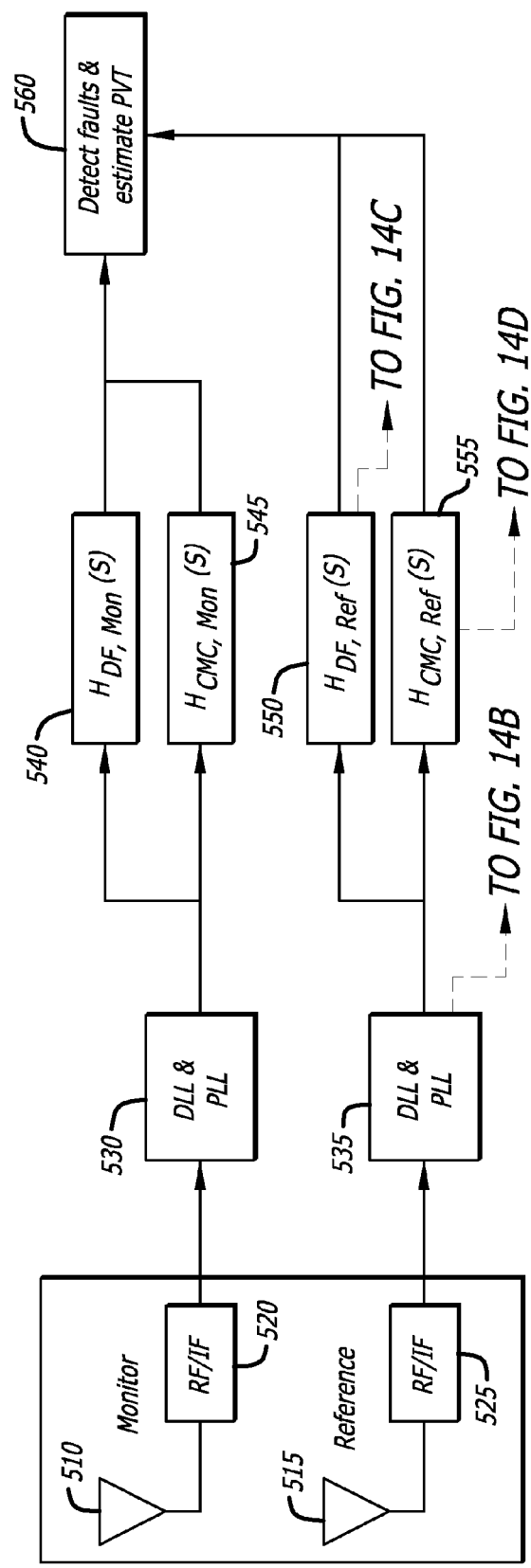
Figure 14B:
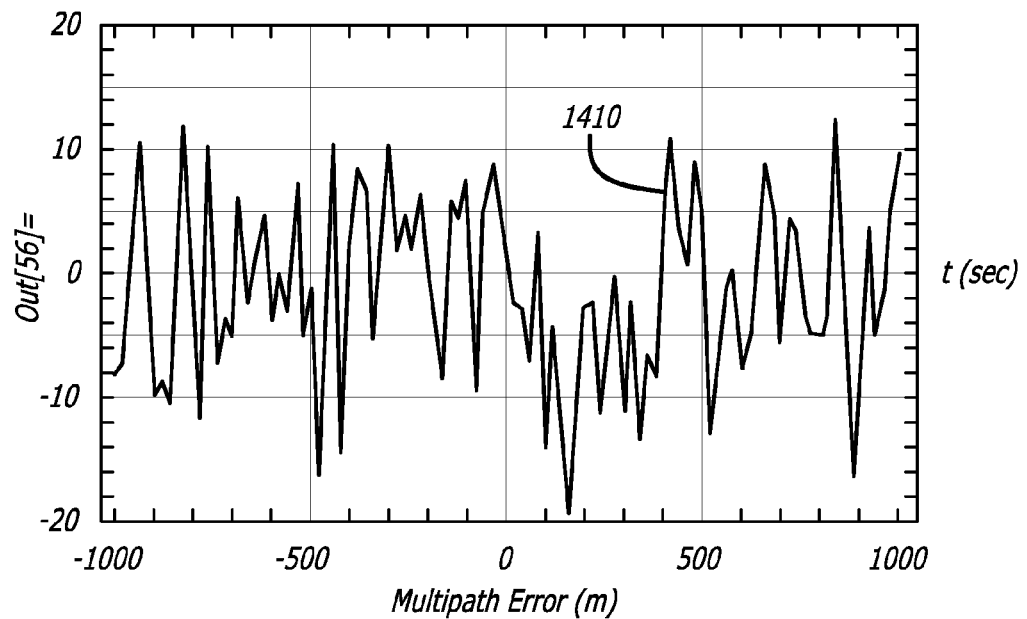
Figure 14C:
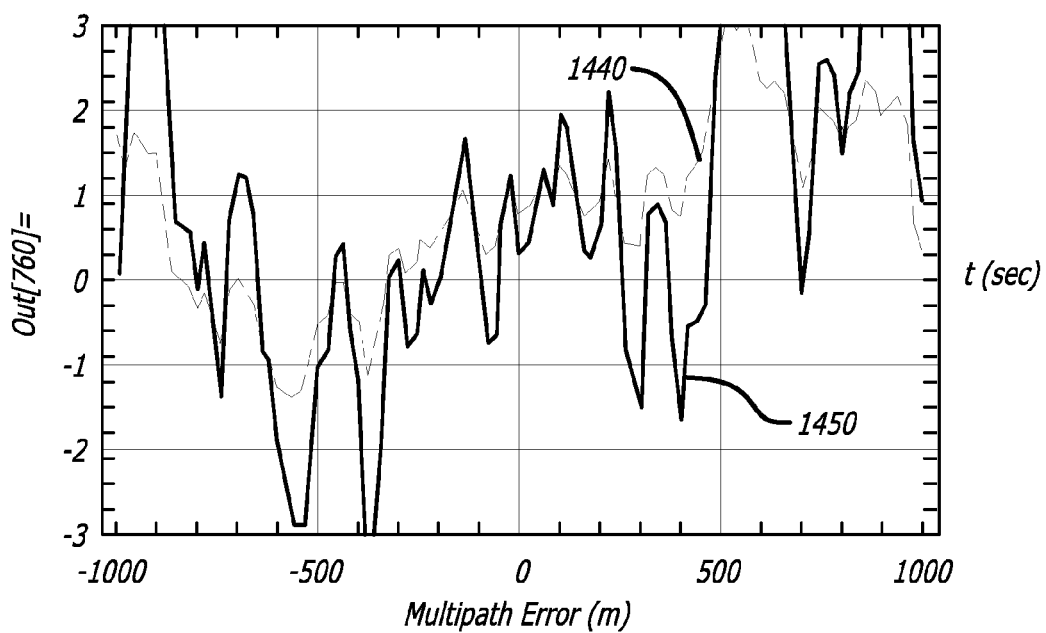

When the surface roughness is modeled with a Gaussian auto-correlation function, the results shown in FIG. 12 are obtained. As shown in FIG. 12, the resulting auto-correlation function Rmult [τ] is a function of the variance of the surface roughness $\sigma^2$, the decorrelation distance of the surface roughness $d_x$, the train velocity $v_x$, and the time between samples τ. With this auto-correlation function Rmult [τ], samples of the corresponding multipath error process can be generated. Using a Cholesky decomposition for this purpose, one resulting sample 1410 is shown plotted on the graph of FIG. 14B, where the x-axis represents time and the y-axis represents multipath error in meters. As shown in FIG. 14B, the peak multipath error of the curve 1410 is around twenty (20) meters, and the standard deviation of this stationary process is approximately seven (7) meters. Such errors are commonplace in strong multipath environments. The processed output is shown in FIG. 14C, where the dashed trace 1440 represents data for a low pass filter with a time constant of 300 seconds, and the solid trace 1450 represents data for a low pass filter with a time constant of 100 seconds.

The auto-correlation distance mentioned above appears at the input of the dual frequency filters 540, 550 and the code minus carrier filters 545, 555. To complete the analysis, the auto-correlation functions at the outputs of these filters 540, 550, 545, 555 need to be obtained. The needed formulas are shown in FIG. 13.

The impulse response h[t_] of either the dual frequency filters 540, 550 or the code minus carrier filters 545, 555 is correlated with its own time reverse, and then convolved with the auto-correlation function of the input noise process. These integrals are cumbersome, but readily handled by a symbolic computing program, such as Mathematica. The result is Rcsc [τ], which is the auto-correlation of the output noise process.

Figure 14D:
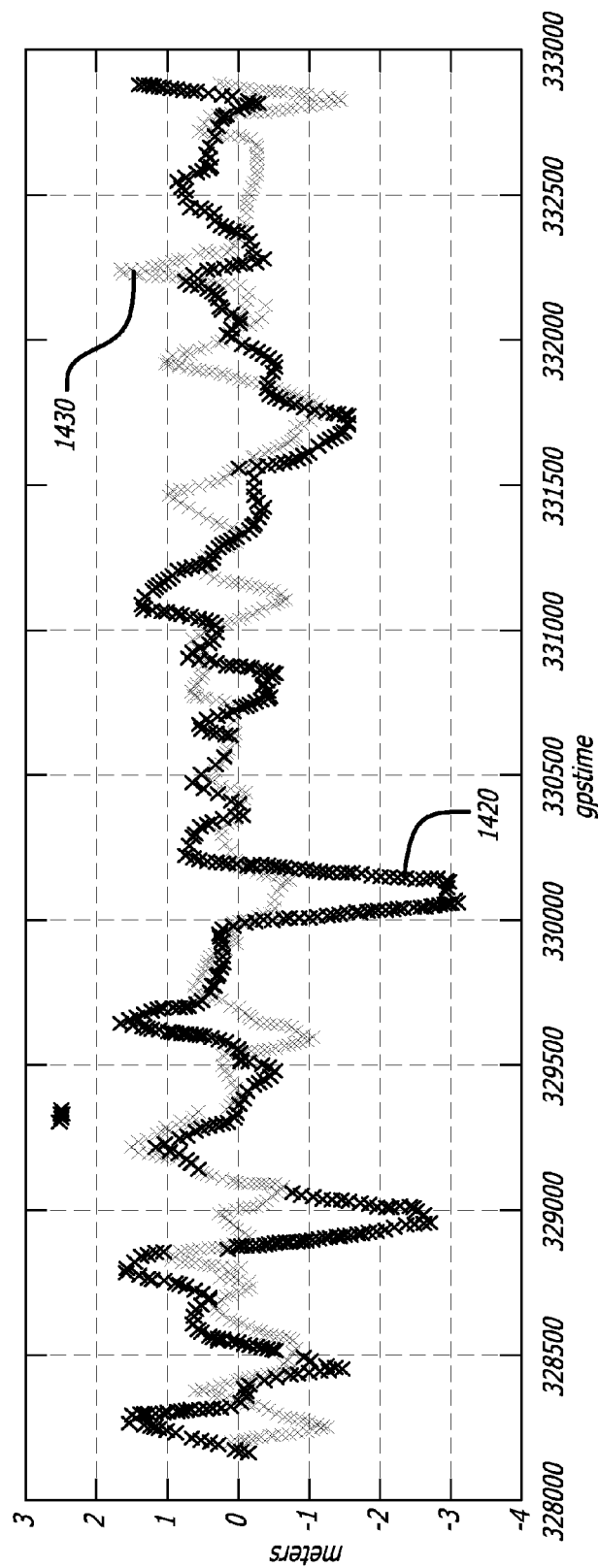

$R_{CSC}$ can be used to compute the variance of the multipath error at the output of the monitor and reference filters 54, 545, 550, 555. With the above mentioned Cholesky decomposition, $R_{CSC}$ can also be used to simulate the multipath error process, which can be compared to actual data collected at the output of a carrier-smoothing filter. The actual data set is shown in the graph of FIG. 14D, where the x-axis represents time and the y-axis represents distance in meters. As shown, the measurements are taken over a period of 5000 seconds (i.e. approximately 83 minutes). The dark trace 1420 on the graph denotes data for a first antenna, and the light trace 1430 on the graph indicates data for a second nearby antenna. Note that, according to the plotted data, the second antenna shows less sensitivity to multipath than the first antenna.

The traces plotted on the graphs of FIGS. 15A and 15B illustrate data for random samples that were generated using the $R_{CSC}$ and the Cholesky decomposition. Two traces are provided for each of the graphs for FIGS. 15A and 15B. The dashed trace 1510 plotted in the graph of FIG. 15A represents data for a low pass filter with a time constant of 300 seconds, and the sample deviation of this sample is 1.08 meters. The solid trace 1520 plotted in the graph of FIG. 15A represents data for a low pass filter with a time constant of 100 seconds and, as such, the standard deviation increases to 1.97 meters. The dashed trace 1530 plotted on the graph of FIG. 15B represents data for a low pass filter with a time constant of 300 seconds, and has a standard deviation of 0.93 meters. The solid trace 1540 plotted on the graph of FIG. 15B corresponds to data for a low pass filter with a time constant of 200 seconds, and has a standard deviation of 1.22 meters. The error growth shown on the graphs for low pass filters with time constants from 100 to 200 to 300 seconds conforms with expectations. The similarity of the actual data show in FIG. 14D and the sample data shown in FIGS. 15A and 15B are consistent.

FIGS. 16 through 19 show graphs illustrating the pre-multipath errors for different low pass filter time constants, the post-multipath errors for different low pass filter time constants, and the step responses for low pass filters, with different time constants, for the monitor receiver and the reference receiver when the disclosed system is employed with a train that is moving slowly or fast next to a smooth or rough wall. In particular, FIGS. 16A through 16C show data for a train moving slowly next to a smooth wall. The train speed is only 0.03 $d_x$/s, where dx is the decorrelation distance of the reflecting wall. The wall has a surface roughness of 0.19 meters (i.e. one standard deviation). Note that 0.19 meters is equal to one wavelength at the GPS L1 frequency. FIGS. 17A through 17C show data for a train moving more quickly next to a smooth wall. The train speed is 0.3 $d_x$/s, where dx is the decorrelation distance of the reflecting wall. The wall has a surface roughness of 0.19 meters. FIGS. 18A though 18C show data for a train moving more quickly next to a rough wall. The train speed is 0.3 $d_x$/s, and the wall has a surface roughness of four wavelengths or 0.76 meters (i.e. one standard deviation). FIGS. 19A through 19C show data for a train moving slowly next to a rough wall. The train speed is only 0.03 $d_x$/s, and the wall has a surface roughness of four wavelengths or 0.76 meters.

FIGS. 16A, 17A, 18A, and 19A all show graphs depicting a sample of pre-filter multipath errors. And, FIGS. 16B, 17B, 18B, and 19B all show graphs depicting a sample of post-filter multipath errors. For FIGS. 16B, 17B, 18B, and 19B, each graph contains two traces, where the lighter trace 1602, 1702, 1802, 1902 represents data for a low pass filter with a time constant of 300 seconds and the darker trace 1605, 1705, 1805, 1905 represents data for a low pass filter with a time constant of 100 seconds. Table 1 below gives the standard deviations of the post-filter multi-path errors.

TABLE 1

Sample standard deviations for the multipath error processes simulated in FIGS. 8, 9 and 10.

| | Train speed measured in decorrelation distances ($d_x$) per second | |
|---|---|---|
| | 0.03 $d_x$/s | 0.3 $d_x$/s |
| Smooth wall | τ = 300 s: σ = 1.08 m | τ = 300 s: σ = 0.32 m |
| 1σ = 1λ = 0.19 m | τ = 100 s: σ = 1.97 m | τ = 100 s: σ = 0.66 m |
| Rough wall | τ = 300 s: σ = 0.38 m | τ = 300 s: σ = 0.16 m |
| 1σ = 4λ = 0.76 m | τ = 100 s: σ = 0.83 m | τ = 100 s: σ = 0.31 m |

Table 1 shows noise sensitivity to train speed and the roughness of the reflecting wall. The standard deviation of the multipath error decreases if the train goes faster or if the wall is rougher because either effect whitens (i.e. randomizes) the multipath and increases the processing gain of the smoothing filters.

As expected, multipath is most worrisome when the reflecting wall is smooth and/or the train is moving slowly. In these cases, the multipath presents more nearly as a bias, and the smoothing filters are less effective. Of course, longer time constants always seem to help. In dual frequency systems, these time constants can be quite long. However, they probably should not be much longer than a few hundred seconds. Otherwise, the readmission time for a satellite that has suffered a cycle slip would be very long, and availability would suffer.

FIGS. 16C, 17C, 18C, and 19C show summary plots showing the noise analysis combined with the deterministic step responses for each of the specific train scenarios. The medium solid curve 1610, 1710, 1810, 1910 and the light solid curve 1620, 1720, 1820, 1920 of these graphs are the step responses of low pass filters connected to the monitor antenna. The dashed line 1640, 1740, 1840, 1940 and the broken line 1650, 1750, 1850, 1950 are the noise responses, respectively, of those same filters. More specifically, they give three times the standard deviation due to multipath with the indicated train velocity and reflecting roughness.

The monitor filters used for the data shown in FIGS. 16, 17, 18, and 19 have time constants of 50 and 100 seconds, respectively. As shown in FIG. 16C, the underlying step causes the solid curves 1610 and 1620 to exceed the noise threshold at 100 seconds after the onset of the step. The curves 1630, 1660, 1670, 1680 show the growth of the reference error in response to the fault step. The solid line curve 1630 is the fault step response without noise. The darkest dashed curve 1660 is the fault step response plus three standard deviations of background noise. As shown, this curve 1660 grows to a value of approximately five (5) meters at 100 seconds. Hence, the range error bound that can be protected is approximately five (5) meters. This protection level is specific to the train speed, wall roughness, and multipath amplitude. The train speed is measured by an inexpensive dead reckoning device or using the GNSS measurements. The wall roughness would need to be bounded based on experimental evaluations of train yards. The multipath amplitude would depend on the reflection environment, antennas and correlator strategy used by the receivers.

The protection level is also sensitive to the filter time constants and relative antenna locations. These parameters are partially under the control of the designer and can be optimized to minimize the protection level.

If the train velocity is higher or if the reflecting surface is lower, this range error bound becomes smaller. FIG. 16 is for a train velocity of 0.03 $d_x$/s and a roughness of one wavelength. FIG. 18 is for a train velocity of 0.3 $d_x$/s and a roughness of four wavelengths. As shown in the related figures, the guaranteed protection levels become smaller as the train speed increases or as the wall roughness increases. Both of these effects whiten the multipath error and increase the processing gain of $H_{DF}(s)$ and/or $H_{CMC}(s)$.

As shown in FIGS. 16 though 19 and summarized in Table 1, the performance of the disclosed system and method improves as the train speed increases. The worrisome multipath errors are smaller at high speed because the high speed randomizes the multipath error and averaging is more effective against random errors. Thus, the disclosed multipath detection can operate at lower thresholds when the train speed is high. For example, FIG. 16 is for a slow train, and the monitor step response does not exceed the monitor noise level until it reaches 6.4 meters. In contrast, FIG. 17 is for a more rapidly moving train. In the second case, the monitor step response exceeds the noise threshold when it reaches 2.1 meters. The present disclosure uses dead reckoning measurements of train speed to set these multipath detection thresholds.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:
1. A method to improve navigation for a vehicle by utilizing detected multipath on the vehicle, the method comprising:
   receiving, with a monitor antenna, at least one first signal, wherein the monitor antenna is located at a position on a front area of the vehicle;
   receiving, with a reference antenna, at least one second signal, wherein the reference antenna is located at a position on a back area of the vehicle;
   processing, with at least one monitor receiver, the at least one first signal to obtain monitor measurement information;
   processing, with at least one reference receiver, the at least one second signal to obtain reference measurement information;
   generating, with at least one processor, an estimate of a state of the reference antenna by using the monitor measurement information, the reference measurement information, and estimates of speed and direction of the vehicle; and
   calculating, with the at least one processor, the monitor measurement information for multipath detection to determine whether to isolate and exclude the reference measurement information obtained from the at least one second signal from individual satellites by measuring the correlation of the reference measurement information and the monitor measurement information by using sensors of vehicle speed and direction, and by increasing a significance of the monitor measurement information when the reference antenna passes close to previous locations of the monitor antenna.

2. The method of claim 1, wherein the state of the reference antenna comprises at least one of a position of the vehicle, a velocity of the vehicle, and time offsets for the vehicle.

3. The method of claim 1, wherein the at least one first signal and the at least one second signal each include at least one navigation signal transmitted from at least one satellite.

4. The method of claim 1, wherein the position of the monitor antenna is in alignment with the position of the reference antenna along a length of the vehicle.

5. The method of claim 1, wherein the monitor antenna and the reference antenna are each configured to receive signals having a first frequency and signals having a second frequency.

6. The method of claim 1, wherein the at least one monitor receiver includes at least one monitor filter to filter the at least one first signal, and
   the at least one reference receiver includes at least one reference filter to filter the at least one second signal, wherein the at least one monitor filter uses a shorter time constant than the at least one reference filter.

7. The method of claim 1, wherein the vehicle is one of a train, a terrestrial vehicle, an aircraft, and a marine vessel.

8. A system to improve navigation for a vehicle by utilizing detected multipath on the vehicle, the system comprising:
   a monitor antenna to receive at least one first signal, wherein the monitor antenna is located at a position on a front area of the vehicle;
   a reference antenna to receive at least one second signal, wherein the reference antenna is located at a position on a back area of the vehicle;
   at least one monitor receiver to process the at least one first signal to obtain monitor measurement information;
   at least one reference receiver to process the at least one second signal to obtain reference measurement information;
   at least one processor to generate an estimate of a state of the reference antenna by using the monitor measurement information, the reference measurement information, and estimates of speed and direction of the vehicle; and
   to use the monitor measurement information for multipath detection to determine whether to isolate and exclude the reference measurement information obtained from the at least one second signal from individual satellites by measuring the correlation of the reference measurement information and the monitor measurement information by using sensors of vehicle speed and direction, and by increasing a significance of the monitor measurement information when the reference antenna passes close to previous locations of the monitor antenna.

9. The system of claim 8, wherein the state of the reference antenna comprises at least one of a position of the vehicle, a velocity of the vehicle, and time offsets for the vehicle.

10. The system of claim 8, wherein the at least one first signal and the at least one second signal each include at least one navigation signal transmitted from at least one satellite.

11. The system of claim 8, wherein the position of the monitor antenna is in alignment with the position of the reference antenna along a length of the vehicle.

12. The system of claim 8, wherein the monitor antenna and the reference antenna are each configured to receive signals having a first frequency and signals having a second frequency.

13. The system of claim 8, wherein the at least one monitor receiver includes at least one monitor filter to filter the at least one first signal, and
   the at least one reference receiver includes at least one reference filter to filter the at least one second signal, wherein the at least one monitor filter uses a shorter time constant than the at least one reference filter.

14. The system of claim 8, wherein the vehicle is one of a train, a terrestrial vehicle, an aircraft, and a marine vessel.

15. A method to improve navigation for at least two vehicles by utilizing detected multipath on the at least two vehicles, the method comprising:
   receiving, with at least one monitor antenna for at least one of the vehicles, at least one first signal;
   receiving, with a reference antenna for one of the vehicles, at least one second signal,
   wherein the at least one monitor antenna is located at a position in front of a position of the reference antenna;
   processing, with at least one monitor receiver for each of the monitor antennas, the at least one first signal, which is received by the monitor antenna that is associated with the at least one monitor receiver, to obtain monitor measurement information for the vehicle that is associated with the at least one monitor receiver;
   processing, with at least one reference receiver for the reference antenna, the at least one second signal, which is received by the reference antenna, to obtain reference measurement information for the vehicle that is associated with the at least one reference receiver;
   generating, with at least one processor, an estimate of a state of the reference antenna by using the monitor measurement information, the reference measurement information, and estimates of speed and direction of the vehicle; and
   calculating, with the at least one processor, the monitor measurement information for multipath detection to determine whether to isolate and exclude the reference measurement information obtained from the at least one second signal from individual satellites by measuring the correlation of the reference measurement information and the monitor measurement information by using sensors of vehicle speed and direction, and by increasing a significance of the monitor measurement information when the reference antenna passes close to previous locations of the monitor antenna.

16. The method of claim 15, wherein the state of the reference antenna comprises at least one of a position of the vehicle associated with the reference antenna, a velocity of the vehicle associated with the reference antenna, and time offsets for the vehicle associated with the reference antenna.

17. The method of claim 15, wherein the at least one first signal and the at least one second signal each include at least one navigation signal transmitted from at least one satellite.

18. The method of claim 15, wherein the position of the at least one monitor antenna is in alignment with the position of the reference antenna.

19. The method of claim 15, wherein the at least one monitor antenna and the reference antenna are each configured to receive signals having a first frequency and signals having a second frequency.

20. The method of claim 15, wherein the at least one monitor receiver includes at least one monitor filter to filter the at least one first signal, and
the at least one reference receiver includes at least one reference filter to filter the at least one second signal,
wherein the at least one monitor filter uses a shorter time constant than the at least one reference filter.

21. The method of claim 15, wherein at least one of the vehicles is at least one of a train, a terrestrial vehicle, an aircraft, and a marine vessel.

22. A system to improve navigation for at least two vehicles by utilizing detected multipath on the at least two vehicles, the system comprising:
at least one monitor antenna, for at least one of the vehicles, to receive at least one first signal;
a reference antenna for one of the vehicles, to receive at least one second signal,
wherein the at least one monitor antenna is located at a position in front of a position of the reference antenna;
at least one monitor receiver for each of the monitor antennas to process the at least one first signal, which is received by the monitor antenna that is associated with the at least one monitor receiver, to obtain monitor measurement information for the vehicle that is associated with the at least one monitor receiver;
at least one reference receiver for the reference antenna to process the at least one second signal, which is received by the reference antenna, to obtain reference measurement information for the vehicle that is associated with the at least one reference receiver;
at least one processor, to generate an estimate of a state of the reference antenna by using the monitor measurement information, the reference measurement information, and estimates of speed and direction of the vehicle; and
to use the monitor measurement information for multipath detection to determine whether to isolate and exclude the reference measurement information obtained from the at least one second signal from individual satellites by measuring the correlation of the reference measurement information and the monitor measurement information by using sensors of vehicle speed and direction, and by increasing a significance of the monitor measurement information when the reference antenna passes close to previous locations of the monitor antenna.

23. The system of claim 22, wherein the state of the reference antenna comprises at least one of a position of the vehicle associated with the reference antenna, a velocity of the vehicle associated with the reference antenna, and time offsets for the vehicle associated with the reference antenna.

24. The system of claim 22, wherein the at least one first signal and the at least one second signal each include at least one navigation signal transmitted from at least one satellite.

25. The system of claim 22, wherein the position of the at least one monitor antenna is in alignment with the position of the reference antenna.

26. The system of claim 22, wherein the at least one monitor antenna and the reference antenna are each configured to receive signals having a first frequency and signals having a second frequency.

27. The system of claim 22, wherein the at least one monitor receiver includes at least one monitor filter to filter the at least one first signal, and
the at least one reference receiver includes at least one reference filter to filter the at least one second signal,
wherein the at least one monitor filter uses a shorter time constant than the at least one reference filter.

28. The system of claim 22, wherein at least one of the vehicles is at least one of a train, a terrestrial vehicle, an aircraft, and a marine vessel.

* * * * *